United States Patent
Kubo et al.

(10) Patent No.: US 7,129,664 B2
(45) Date of Patent: Oct. 31, 2006

(54) ROBOT CONTROLLER

(75) Inventors: Hitoshi Kubo, Akashi (JP); Naoyuki Matsumoto, Okayama-ken (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 11/360,420

(22) Filed: Feb. 24, 2006

(65) Prior Publication Data
US 2006/0197486 A1    Sep. 7, 2006

(30) Foreign Application Priority Data
Mar. 1, 2005    (JP) ............................. 2005-055980

(51) Int. Cl.
*G05B 19/10*    (2006.01)
(52) U.S. Cl. ............ 318/567; 318/568.11; 318/568.16; 700/245; 700/250
(58) Field of Classification Search ................ 318/567, 318/568.11, 568.13, 574, 575; 700/245, 700/250, 253
See application file for complete search history.

(56) References Cited

U.S. PATENT DOCUMENTS

| | | | | |
|---|---|---|---|---|
| 4,587,618 A | | 5/1986 | Oguchi et al. | |
| 4,815,007 A | * | 3/1989 | Sakai et al. | 700/253 |
| 5,083,072 A | * | 1/1992 | Song | 318/571 |
| 5,369,568 A | * | 11/1994 | Song | 700/61 |
| 5,386,499 A | * | 1/1995 | Tokita | 700/250 |
| 6,741,055 B1 | * | 5/2004 | Kurokawa et al. | 318/560 |
| 6,829,038 B1 | * | 12/2004 | Miwa | 355/53 |

FOREIGN PATENT DOCUMENTS

| | | |
|---|---|---|
| JP | A-58-177289 | 10/1983 |
| JP | A-09-258812 | 10/1997 |

* cited by examiner

*Primary Examiner*—Rina Duda
(74) *Attorney, Agent, or Firm*—Oliff & Berridge, PLC

(57) ABSTRACT

A robot hand is moved at a moving speed in direct movement from a start position to an end position. When the robot hand passes through a setting position on a movement route from the start position to the end position, a setting position passing signal is outputted. At this time, a robot controller does not lower the moving speed of the robot hand before and after arrival at the setting position. Therefore, the reduction in the moving speed of the robot hand due to existence of the setting position can be prevented and the movement time of the robot hand can be prevented from undesired prolongation. By doing this, the cycle time can be shortened and the operability of the robot can be improved.

12 Claims, 14 Drawing Sheets

(1)

(2)

ROBOT CONTROLLER

CROSS REFERENCE TO RELATED APPLICATIONS

This application is base upon the prior Japanese Patent Application No. 2005-55980 filed on Mar. 1, 2005, the entire contents of which are incorporated herein by reference.

BACKGROUND OF THE INVENTION

1. Field of the Invention

The present invention relates to a robot controller which executes a preset operation content when it judges that a standard moving part installed on a robot reaches a preset setting position.

2. Description of the Related Art

FIG. 15 is a drawing showing a transfer operation of a workpiece 2 by a robot. The robot performs the operation in the order of (1) to (6) of FIG. 15, retains the workpiece 2 retained by a chuck 3 by a robot hand 1, and transfers the workpiece 2 to a predetermined place. A part of a program example of the related art in this case is shown in Table 1 indicated below. Further, FIG. 16 is a graph showing a change with time of the speed of the robot hand when the operation of the program shown in Table 1 is performed.

TABLE 1

| : | : |
|---|---|
| LMOVE | #A |
| LMOVE | #B |
| SIGNAL | 1, 2 (Hand opening instruction, chuck opening instruction) |
| LMOVE | #C |
| SIGNAL | −1 (Hand closing instruction) |
| LMOVE | #D |
| LMOVE | #E |
| SIGNAL | 3 (Workpiece supply instruction) |
| LMOVE | #A |
| : | |

The robot controller moves the hand 1 toward the chuck 3 retaining the workpiece 2 and stops it at a first position A above the workpiece 2 (LMOVE #A). Next, the robot controller moves the hand 1 from the first position A to a second position B close to the chuck 3 and stops the hand 1 at the second position B (LMOVE #B). Next, the robot controller gives an instruction for opening the hand 1 and an instruction for opening the chuck 3 (SIGNAL 1, 2) and then moves the hand 1 from the second position B to a third position C close to the chuck 3 and stops the hand 1 at the third position C (LMOVE #C). Next, the robot controller gives an instruction for closing the hand 1 (SIGNAL-1) and moves the hand 1 from the third position #C to a fourth position D and stops the hand 1 at the fourth position D. When the hand 1 moves to the fourth position D, it enters a state of clamping the workpiece 2. Next, the robot controller moves the hand 1 to a fifth position E farther than the fourth position D (LMOVE #E) from the chuck 3 and stops the hand 1 at the fifth position. Next, the robot controller gives an instruction for supplying another workpiece 2 to the chuck 3 (SIGNAL 3) and moves the hand 1 from the fourth position E to the first position A.

As mentioned above, the robot hand controller, when the hand 1 reaches the predetermined setting positions B, C, and E, stops the robot, opens or closes the hand 1, outputs the chuck opening or closing instruction, and outputs the workpiece supply instruction.

Further, a controller disclosed in Japanese Patent Laid-Open Publication No. 9-258812 outputs a setting position passing signal when it judges that an estimated position of a laser welding device reaches a predetermined setting position during the laser welding device is moved by a robot along a predetermined movement path. The controller decides the estimated position on the basis of the change in the movement instruction of the laser welding device and the movement position.

Further, the controller disclosed in Japanese Patent Laid-Open Publication No. 58-177289 moves a hand horizontally and vertically by a robot and handles a workpiece. The controller moves the hand horizontally, judges that it reaches a setting position before a handling position, and outputs a setting position passing signal. And, when the controller outputs the setting position passing signal, it starts the vertical movement of the hand. By doing this, the hand draws a smooth arc movement trace and reaches the handling position.

As mentioned above, the robot controller of the related art executes operation contents in accordance with the setting position when judging that a standard moving part, such as a robot hand, installed on the robot reaches a predetermined setting position on the movement route, In the related art shown in FIG. 16, the controller, when the hand 1 reaches the setting positions B, C, and E on the movement route, stops the movement of the hand 1. Therefore, whenever the hand 1 moves to the setting positions B, C, and E, the movement operation of the hand 1 is discontinued, and the mean speed of the hand 1 is lowered, and a problem arises that the operation efficiency is lowered.

FIG. 17 is a drawing for explaining the movement route of the standard moving part and FIG. 18 includes graphs showing a change with time of the moving speed of the standard moving part. FIG. 18(1) shows a case that a first operation D1 moving from the movement start position A to the setting position C and a second operation D2 moving from the setting position C to the movement end position B are performed individually and FIG. 18(2) shows a case that a part of the first operation D1 and a part of the second operation D2 are performed simultaneously.

As shown in FIG. 17, even if the standard moving part is moved from the movement start position A to the movement end position B, it may be shifted from a movement route 18 for direct movement from the movement start position A to the movement end position B, thus the setting position C may be set. In this case, the standard moving part moves from the movement start position A toward the setting position C and stops at the setting position C. And, during movement from the setting position C toward the movement end position B, the robot controller executes the operation contents in accordance with the setting position C.

In this case, one single operation D3 directly moving from the movement start position A to the movement end position B as shown by the dashed line in FIG. 18(1) is divided into the first operation D1 moving from the movement start position A to the setting position C and the second operation D2 moving from the setting position C to the movement end position B. Therefore, to move toward the setting position C halfway the movement from the movement start position A to the movement end position B, the hand must slow down and the time W1 required for movement from the movement start position A to the movement end position B becomes longer than the time W2 required for direct movement from the movement start position A to the movement end position B.

Further, when the setting position C is installed at a place shifted from the transfer route 18 for direct movement from the movement start position A to the movement end position B, the movement route of the standard moving part is extended, thus the movement time becomes much longer than direct movement from the transfer start position A to the transfer end position B.

In the art disclosed in Japanese Patent Laid-Open Publication No. 58-177289, as shown in FIG. 18(2), the standard moving part, before completion of the first operation D1, starts the second operation D2 together with the first operation D1. In this case, as shown by a two-dot chain line in FIG. 17, the standard moving part does not pass through the setting position C but moves in the neighborhood of the setting position C along a smooth track 17, and moves from the movement start position A to the movement end position B. And, the standard moving part, at the point of time tC when the second operation is started together with the first operation D1, executes the operation contents according to the setting position C. Even in this case, as compared with the single operation D3, during the period W3 when the first operation D1 and the second operation D2 are performed at the same time and the periods W4 and W5 before and after it, the speed of the standard moving part is inevitably lowered. Therefore, the time W6 required for movement from the movement start position A to the movement end position B becomes longer than the time W2 required for direct movement from the movement start position A to the movement end position B.

SUMMARY OF THE INVENTION

Therefore, an object of the present invention is to provide a robot controller which is able to prevent a standard moving part of a robot from a reduction in its speed in the case that an operation content is executed in accordance with a predetermined setting position when the standard moving part reaches the setting position.

The present invention is a robot controller including: a movement arithmetic unit configured to calculate a plurality of movement positions respectively corresponding to predetermined control time intervals when a standard moving part installed on a multi-axial robot is moved from a first position to a second position along a predetermined movement route; a control unit configured to control the robot by deciding each of axial movement amounts of the robot for sequentially moving the standard moving part to each of the movement positions at each of the control time intervals; an information storage unit configured to store a setting position relating information for deciding a setting position to be set on the movement route and an operation content information about an operation content to be performed when the standard moving part passes through the setting position; a setting position calculation unit configured to calculate the setting position based on the setting position relating information stored in the information storage unit; and an operation content execution unit configured to execute the operation content corresponding to the setting position base on the setting position relating information stored in the information storage unit when judging that the movement position, where the standard moving part exists, passes through the setting position during a control of the robot by the control unit based on a calculation result of the movement arithmetic unit.

Preferably, the setting position relating information includes a relating position having a relevance which is predetermined with respect to the movement route and the setting position and a relating information showing the relevance.

Preferalby, the present invention further includes an input unit to which a movement instruction of the standard moving part is given. The control unit controls the robot so as to move the standard moving part in accordance with the movement instruction which is given from the input unit. The setting position calculation unit uses the movement position of the standard moving part which is moved in accordance with the movement instruction as the relating position to calculate the setting position.

Preferably, the setting position relating information is an information about a movement amount of the standard moving part along the movement route from either of the first position and the second position to the setting position.

Preferably, the setting position relating information is an information about a rate of a setting position movement amount in a movement of the standard moving part from either of the first position and the second position to the setting position to a total movement amount from the first position to the second position.

Preferably, the robot can be controlled in both of a first operation mode for moving the standard moving part sequentially to each of the movement positions at each of the control time intervals and a second operation mode for temporarily stopping the standard moving part at the setting position during a movement of the standard moving part along the movement route from the first position to the second position.

The present invention is a robot control method of moving a standard moving part installed on a multi-axial robot along a predetermined movement route from a first position to a second position, including: an information storing step of storing the first position, the second position, a setting position relating information for deciding a setting position which is set on the movement route of the standard moving part and an operation content information about an operation content to be performed when the standard moving part passes through the setting position; a movement arithmetic step of calculating a plurality of movement positions respectively corresponding to predetermined control time intervals when the standard moving part is moved from the first position to the second position along the predetermined movement route; a setting position calculating step of calculating the setting position based on the setting position relating information which is stored by the information storing step, a control step of controlling the robot by deciding each of axial movement amounts of the robot for sequentially moving the standard moving part to each of the movement positions at each of the control time intervals; and an operation content execution step of executing the operation content corresponding to the setting position based on the setting position relating information stored by the information storing step when judging that the movement position, where the standard moving part exists, passes through the setting position during an execution of the control step.

Preferably, the setting position relating information includes a relating position having a relevance which is predetermined with respect to the movement route and the setting position and a relating information showing the relevance.

Preferably, the robot control method further includes a step of inputting a movement instruction of the standard moving part to an input unit. The robot is controlled so as to move the standard moving part in accordance with the movement instruction which is given from the input unit. The movement position of the standard moving part which is moved in accordance with the movement instruction is used as the relating position to calculate the setting position in the setting position calculating step.

Preferably, the setting position relating information is an information about a movement amount of the standard moving part along the movement route from either of the first position and the second position to the setting position.

Preferably, the setting position relating information is an information about a rate of a setting position movement amount in a movement of the standard moving part from either of the first position and the second position to the setting position to a total movement amount from the first position to the second position.

Preferably, the robot can be controlled in both of a first operation mode for moving the standard moving part sequentially to each of the movement positions at each of the control time intervals and a second operation mode for temporarily stopping the standard moving part at the setting position during a movement of the standard moving part along the movement route from the first position to the second position.

According to the robot controller of the present invention, the movement arithmetic unit calculates a plurality of movement positions respectively corresponding to each of predetermined control time intervals when the standard moving part is moved from the first position to the second position. And, the control unit decides each of axial movement amounts of the robot at each of the control time intervals on the basis of the movement positions calculated by the movement arithmetic unit. The controller gives each axial movement amount to the robot, thus the robot moves the standard moving part sequentially to the movement positions at each of the control time intervals. By doing this, the standard moving part is moved along a predetermined movement route from the first position to the second position.

Further, the setting position calculation unit obtains the setting position relating information from the information storage unit and calculates the setting position on the basis of the setting position relating information obtained. And, the operation content execution unit, during the movement of the standard moving part from the first position to the second position by the robot, judges whether the movement position, where the standard moving part exists, passes through the setting position or not. The operation content execution unit, when it judges that the standard moving part passes through the setting position, executes the operation contents in accordance with the setting position through which the standard moving part passes.

For example, the operation content execution unit, when it judges that the standard moving part passes through the setting position, outputs a setting position passing signal. In this case, another device receives the setting position passing signal. And, the setting position passing signal is used as an operation start instruction for the concerned device. By doing this, after the standard moving part reaches the setting position, the concerned device can start operation. For example, without stopping the robot hand, the operation content execution unit can open or close the hand and chuck when the robot passes through the setting position.

Further, the controller controls the robot on the basis of calculation results of the movement arithmetic unit, thus the standard moving part moves along the movement path at the movement speed of direct movement from the first position to the second position. By doing this, even if the setting position exists on the movement route, the standard moving part does not lower the movement speed before and after arrival at the setting position. Therefore, the movement time of the standard moving part can be prevented from undesirable prolongation. Therefore, the cycle time can be shortened and the operability of the robot can be improved.

Further, the setting position is calculated by the setting position calculation unit, so that the setting position located on the movement route can be decided accurately. Further, an operator does not need to directly teach the setting position to the controller and can perform easily a preparation operation for the robot operation.

Further, according to the present invention, the setting position relating information may include the relating position having relevance predetermined for the movement route and the setting position and the relating information showing the relevance. Therefore, the operator, in consideration of the relevance between the relating position and the setting position, teaches the relating position, thus the setting position can be calculated by the setting position calculation unit, and the setting position can be arranged accurately on the movement route. For example, when teaching directly the coordinates of the setting position, it is necessary to input accurate coordinates on the movement route. However, in the present invention, only by deciding the relating position as an approximate position, the controller calculates an accurate setting position, so that the robot teaching operation can be performed easily. For example, the relating information includes the movement start position, the movement end position, and the interpolation route type for movement of the hand from the movement start position to the movement end position.

As an example of the relation between the setting position for the relating position and the movement route, among the straight line extending from the relating position to the movement route, the intersection point of the straight line in which the distance from the relating position to the movement route is shortest with the movement route is decided as a setting position. In this case, if the operator confirms roughly the movement route, the operator can easily decide a relating position corresponding to a desired setting position.

Further, when either of the first position and the second position is adjusted finely and the movement route is changed, the setting position calculation unit recalculates the setting position on the basis of the changed movement route. Due to such a re-calculation, even if the first position and the second position are changed, the setting position is not shifted from the movement route and the operator does not need to teach the setting position again. Therefore, the convenience can be improved.

Further, according to the present invention, the input unit may be operated by the operator, so that the standard moving part moves to an optional position. For example, the input unit is realized by a teach pendant. If the operator confirms the relevance between the relating position and the setting position, the operator can judge the setting position which is to be decided when the standard moving part is arranged at the relating position. Therefore, when the operator roughly confirms where the setting position is arranged, the operator can set the relating position, thus the relating position can be prevented from a teaching error.

Further, according to the present invention stated, the setting position relating information may be a movement amount of the standard moving part along the movement route from the first position or the second position to the setting position. The movement amount includes a movement distance and a movement angle. In this case, if the operator confirms only the movement amount between either of the first position and the second position and the setting position, the operator can set the setting position at a desired position. Therefore, compared with a case of direct teaching of the setting position, the robot teaching operation can be performed easily and accurately and the convenience can be improved. For example, not only to a movement route which is a straight line but also to a movement route which is an arc track from the first position to the second position, the present invention can be applied.

Further, according to the present invention, the setting position relating information may be the rate of the setting position movement amount to the whole movement amount. The movement amount includes a movement distance and a movement angle. In this case, if the operator confirms an approximate movement route, the operator can set the setting position at a desired position. Therefore, compared with a case of direct teaching of the setting position, the robot teaching operation can be performed easily and accurately and the convenience can be improved.

Further, according to the present invention, the robot may be controlled in the second operation mode, thus the standard moving part moves along the movement route from the first position and stops temporarily at the setting position. And, it moves from the setting position to the second position along the movement route. As described above, in the second operation mode, the standard moving part is stopped at the setting position, so that the operator can confirm that the operation content execution unit executes the operation contents when the standard moving part actually arrives at any position and the convenience can be improved. For example, when adjusting finely the setting position, when the standard moving part is temporarily stopped at the setting position in the second operation mode, the operator may teach aging the setting position relating information. By doing this, the operator can set accurately the setting position at a desired position and the convenience can be improved.

Further, the operator executes the second operation mode and confirms setting of the setting position, and then executes the first operation mode. Thus in the actual movement operation of the standard moving part, the reduction in the movement speed of the standard moving part due to existence of the setting position can be prevented and the movement time of the standard moving part can be prevented from undesired prolongation. By doing this, the operability by the robot can be improved.

According to the robot control method of the present invention, the robot control operation may be started in the state that the setting position relating information, the first position, the second position, and the operation content information are stored. When the control operation is started, firstly, a plurality of movement positions respectively corresponding to the predetermined control time intervals are calculated during movement from the first position to the second position and the setting position is calculated on the basis of the setting position relating information. And, each axial movement amount of the robot for sequentially moving the standard moving part to each movement position is decided, thus the robot is controlled. By doing this, the robot moves the standard moving part from the first position to the second position along the movement route.

Further, during movement of the standard moving part by the robot, when it is judged that the movement position of the standard moving part passes through the setting position, the operation contents corresponding to the setting position passed are executed. For example, a setting position passing signal is outputted as an operation content. The outputted setting position passing signal is received by another device. And, it is used as an operation start instruction for the concerned device. By doing this, after the standard moving part reaches the setting position, the concerned device can start operation.

At the control step on the basis of the movement position calculated by the movement arithmetic unit, the standard moving part moves at the movement speed of direct movement from the first position to the second position. Namely, even if the setting position exists between the first position and the second position, the standard moving part does not lower the movement speed before and after arrival at the setting position. Therefore, the reduction in the movement speed of the standard moving part due to existence of the setting position can be prevented and the movement time of the standard moving part can be prevented from undesirable prolongation. Therefore, the operability of the robot can be improved. Further, the setting position is calculated on the basis of the setting position relating information, so that the operator does not need to directly teach the setting position to the controller and can set accurately the setting position on the movement route. By doing this, the operator can easily perform a teaching operation for the robot.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
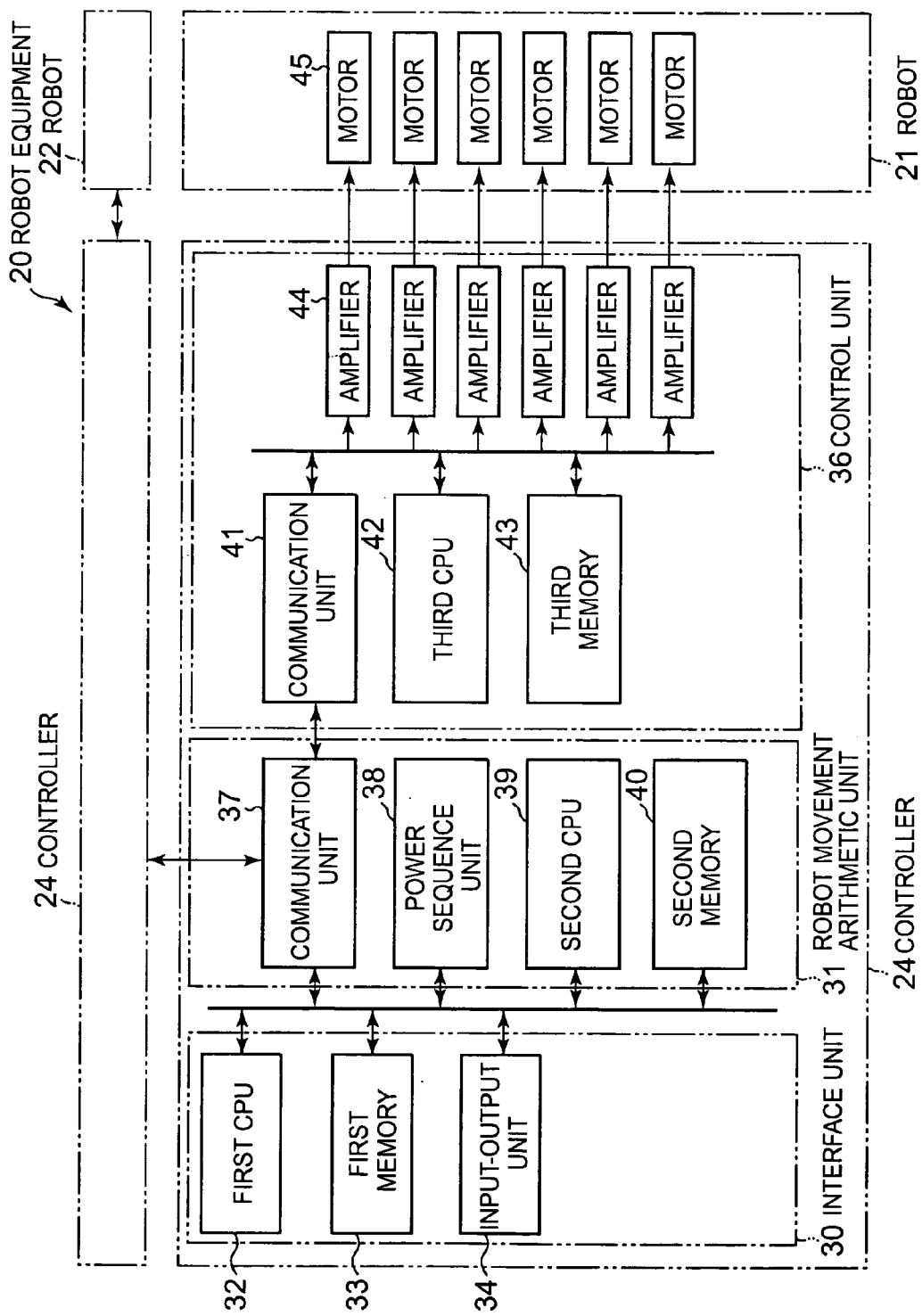
FIG. 1 is a block diagram showing a robot controller 24 of an embodiment of the present invention.
Figure 2:
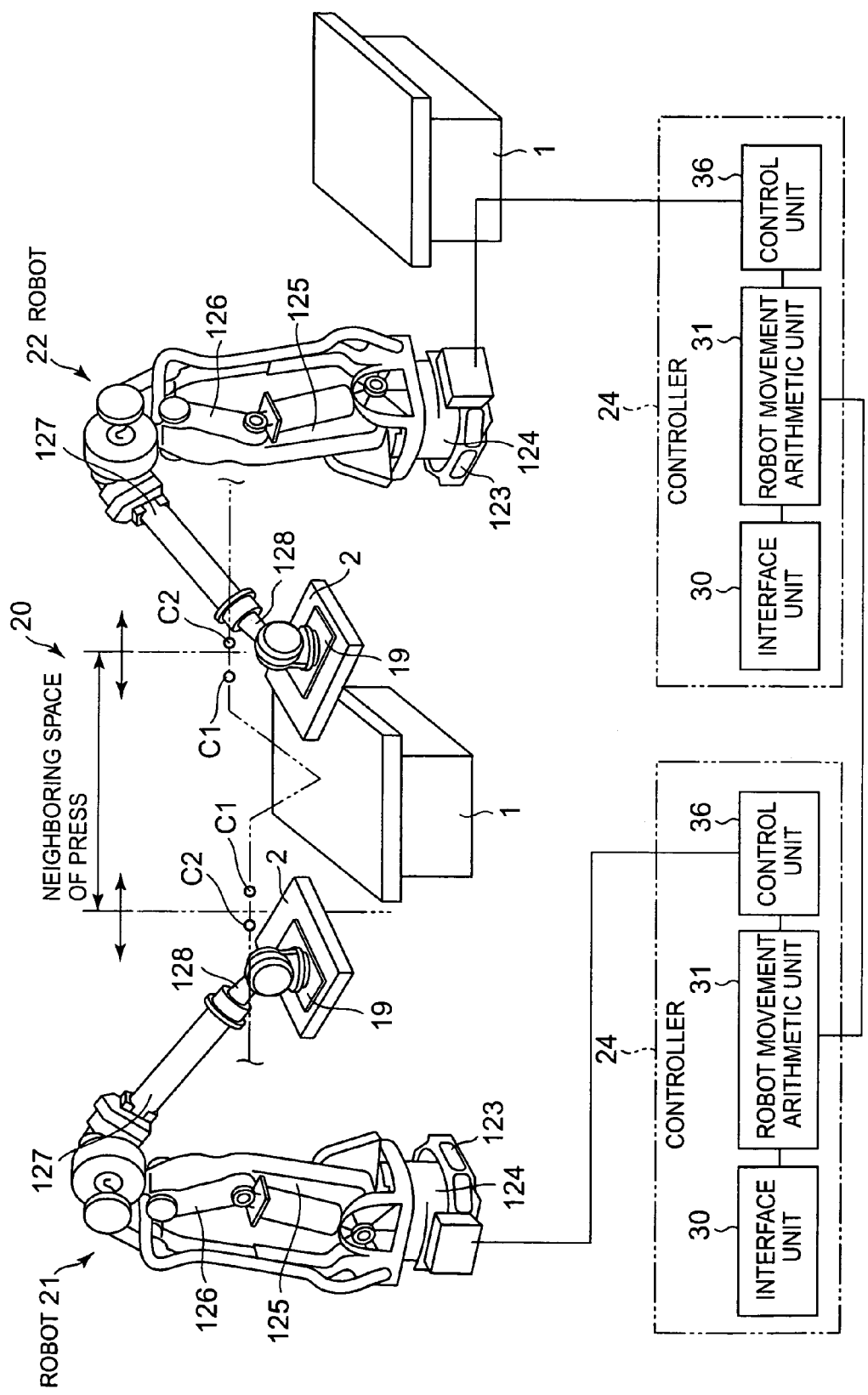
FIG. 2 is a drawing showing robot equipment 20 including the robot controller 24 and robots 21 and 22.

The block diagram of FIG. 1 includes the robot controller 24 of an embodiment of the present invention, and the drawing of FIG. 2 shows the robot equipment 20 including the robot controller 24 and the robots 21 and 22.

The robot equipment 20 of the present invention is structured so as to include the plurality of multi-axial robots 21 and 22 and the robot controller 24 for controlling individually the multi-axial robots 21 and 22 (hereinafter, referred to as just controller 24)). In this embodiment, the robot equipment 20 is installed on the press manufacture line of the workpiece 2 to be transferred. On the manufacture line, a press 1 for pressing the workpiece 2 and the two robots 21 and 22 are arranged. The first robot 21 supplies and transfers the workpiece 2 to the press 1 and the second robot 22 collects and transfers the workpiece 2 from the press 1. Concretely, the first robot 21 transfers the workpiece 2 held to the press 1. Further, the second robot 22 receives and holds the workpiece 2 pressed from the press 1.

When a plurality of presses 1 are arranged side by side and the workpiece 2 is sequentially pressed by the presses 1, the presses 1 and robots are arranged alternately side by side in the transfer direction. In this case, the robots 21 and 22 collect the workpiece 2 from the press 1 on the upstream side in the transfer direction and supply the collected workpiece 2 to the press 1 on the downstream side in the transfer direction. In this way, the inter-press transfer of the workpiece 2 by the plurality of robots 21 and 22 is performed.

When the robot 21 for supplying the workpiece 2 before pressing and the robot 22 for collecting the workpiece 2 after pressing exist for one target press 1, there is a possibility that the robot 21 for supply and the robot 22 for collection may make contact with each other in the neighborhood of the press. To prevent it, when the controller 24 for the robot 21 moves a robot hand 19 to a proximal setting position C1 in the neighboring space of the press 1, it waits for reception of a distal signal indicating that the controller 24 for the robot 22 moves the robot hand 19 to a distal setting position C2 outside the neighboring space of the target press 1. The controller 24 for the robot 21, after receipt of the distal signal, outputs an entrance prohibition signal for prohibiting entrance into the space of the press 1 to the controller 24 for the robot 22 and makes the robot hand 19 enter the proximal space of the press 1.

Next, the controller 24 for the robot 21, when moving the robot hand 1 to the distal setting position C2 outside the neighboring space of the press 1, outputs the distal signal indicating it. Therefore, the robots are prevented from mutual interference and the inter-press transfer of the workpiece 2 can be performed smoothly.

As shown in FIG. 2, a plurality of multi-axial robots 21 and 22 of the robot equipment 20 are realized by, for example, a 6-axis vertical multi-joint robot. The robots 21 and 22 are arranged at mutual intervals across the press 1. For the robots 21 and 22, a rotational body 124 is installed on a base 123 installed on the floor. On the rotational body 124, a plurality of arms 125, 126, and 127 are installed angle-changeably around the respective axes. At the free front end of the arm 127, a wrist 128 is installed. On the wrist 128, a finger device, that is, the so-called end effecter is installed. In this embodiment, the finger device is realized by the robot hand 19 for removably holding the workpiece 2. The robot hand 19 is a standard moving part installed on the robot 21.

For the robots 21 and 22, a servo motor 45 is installed for each rotation axis of the arms 125 to 127. The servo motors 45 operate individually the arms 125 to 127. The servo motors 45 change individually the angle and drive the arms 125 to 127 to move, thereby can move the robot hand 19 to any desired positions and postures.

The controllers 24 are robot controllers for controlling the robots 21 and 22. In this embodiment, the controllers 24 installed for each of the robots 21 and 22 have a similar constitution. Therefore, the controller 24 for the first robot 21 will be explained and the explanation of the controller 24 for the second robot 22 will be omitted.

The controller 24 decides the operation amount of each of the servo motors 45 of the robot 21 necessary to move the robot hand 19 in accordance with a program stored beforehand. And, the operation amount is given to each of the servo motors 45, for example, as a current. Thus the robot hand 19 can be moved using a predetermined movement route, moving speed, and movement posture. In this embodiment, the controller 24 moves the robot hand 19 from the movement start position to the movement end position using a predetermined movement route and moving speed. Further, the controller 24 gives a holding instruction and a releasing instruction to the robot hand 19.

Further, the controller 24 on one side, when judging that the robot hand 19 reaches the proximal setting position C1 set in the neighborhood of the press 1 during its movement in the approaching direction to the press 1 along the movement route, waits for an entrance operation into the neighboring space of the press 1 of the robot hand 19 until it receives the distal signal from the controller 24 on the other side. And, the controller 24 on one side, upon receipt of the distal signal from the controller 24 on the other side, outputs the entrance prohibition signal to the controller 24 on the other side. Further, the controller 24 on one side, when judging that the robot hand 19 reaches the distal setting position C2 set in the neighborhood of the press 1 during its movement in the distal direction from the press 1 along the movement route, outputs the distal signal to the controller 24 on the other side.

Further, the controller 24 on the other side performs the similar operation. Namely, the controller 24 on the other side, when judging that the robot controller 19 reaches the proximal setting position C1 set in the neighborhood of the press 1 durign its movement in the approaching direction to the press 1 along the movement route, waits for the entrance operation into the neighboring space of the press 1 of the robot hand 19 until it receives the distal signal from the controller 24 on one side. And, the controller 24 on the other side, upon receipt of the distal signal from the controller 24 on one side, outputs the entrance prohibition signal to the controller 24 on one side. Further, the controller 24 on the other side, when judging that the robot controller 19 reaches the distal setting position C2 set in the neighborhood of the press 1 during its movement in the distal direction from the press 1 along the movement route, outputs the distal signal to the controller 24 on one side. Therefore, the robots 21 and 22 are prevented from mutual interference and the workpiece transfer can be performed.

As shown in FIG. 1, the controller 24 includes an interface unit 30, a robot movement arithmetic unit 31, and a control unit 36. The interface unit 30 transfers information to an external device or an operator. The robot movement arithmetic unit 31 calculates the movement position where the robot hand 19 moves at every predetermined control time interval. Further, the control unit 36 supplies a current to each of the servo motors 45 so that the robot hand 19 moves to the movement position at every control time interval. Further, the internal components of the controller 24 are connected communicably to a bus line. The control time interval is set to, for example, several milliseconds.

The interface unit 30 is structured so as to include a first CPU 32, a first memory 33, and an input-output unit 34. The input-output unit 34 performs an information input-output operation between the controller 24 and an external device and an information input-output operation between the controller 24 and an operator. In this embodiment, to the input-output unit 34, a teach pendant is connected via a cable. The teach pendant is an input unit for an operator to teach the operation position to the robot. The operator operates the teach pendant, thereby operates the robot 21 and moves the robot hand 19. And, the operator teaches the movement position of the robot hand 19 to the first memory 33 of the controller 24.

Further, the input-output unit 34 gives output information given from the first CPU 32 to the teach pendant. And, the display unit of the teach pendant displays the output information. The operator can operate the operation unit by confirming the display unit. Further, the operator can store robot operation information relating to the robot operation including the position of the robot hand 19 in the first memory 33 using the teach pendant.

Further, the input-output unit 34 is structured so as to be connected to another external device in addition to the teach pendant, so that it can perform the information input-output operation between the controller 24 and the external device. As mentioned above, the controller 24 can obtain the robot operation information from a device other than the teach pendant. Further, an operation unit and a display unit having the same function as that of the teach pendant may be installed in the frame unit of the controller 24.

The first CPU 32 controls the input-output operation of the input-output unit 34 and is realized, for example, by a central processing unit. The first memory 33 stores the operation program and robot operation information of the first CPU 32. Further, the first memory 33 stores calculation results given from the first CPU 32.

The first CPU 32 executes the operation program stored in the first memory 33, thereby decodes the robot operation information stored in the first memory 33, and generates a robot operation plan in accordance with the robot operation information. And, the first CPU 32 gives the generated robot operation plan to the robot movement arithmetic unit 31.

For example, the robot operation information is composed of the movement start position of the robot hand 19, movement end position, passing position, movement route decision information necessary to decide the movement route, moving speed, and information necessary to operate the robot such as the opening and closing positions and opening and closing instructions of the robot hand 19. In this embodiment, the robot operation information includes a robot forward route operation program indicating the forward route operation of the robot hand 19 and a robot backward route operation program indicating the backward route operation. The robot forward route operation program is an operation program of the robot hand 19 from collection of the workpiece 2 from the press 1 on one side to supply of the workpiece 2 to the press 1 on the other side. Further, the robot backward route operation program is an operation program of the robot hand 19 of movement from the press 1 on the other side to the press 1 on one side after supply of the workpiece 2.

Figure 3:
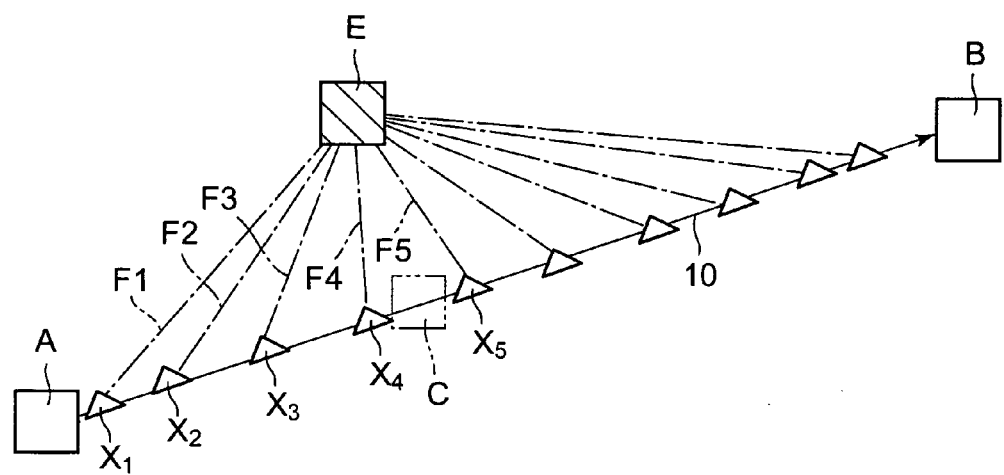
FIG. 3 is a drawing for explaining a setting position relating information.

Further, the robot operation plan generated by the first CPU 32 is information obtained by decoding the robot operation program so as to be processed by a computer. In this embodiment, it includes, as shown in FIG. 3, the coordinates of a first position A which is a movement start position and a second position B which is a movement end position, information indicating a movement route 10, and information indicating a change with time of the moving speed of the robot hand 19.

The robot movement arithmetic unit 31 is structured so as to include a controller communication unit 37, a power sequence unit 38, a second CPU 39, and a second memory 40. The controller communication unit 37 is installed so as to communicate information with a servo communication unit 41, which will be described later, and another controller communication unit. The power sequence unit 38 stores and executes a robot operation program set independently of the robot operation plan such as the start procedure and end procedure of each of the servo motor 45.

The second CPU 39, when the robot operation plan is given from the first CPU 32, on the basis of the robot operation plan, performs an interpolation process for the movement route and calculates a plurality of movement positions on the movement route through which the robot hand 19 moves. Concretely, the second CPU 39 calculates each movement position on the basis of the moving speed indicated in the robot operation plan, acceleration at time of acceleration and deceleration, movement start position, and movement end position. Here, the movement position is a position to which the robot hand 19 sequentially moves at every predetermined control time interval when it moves along a predetermined movement route. In this embodiment, the movement position of the robot hand 19 is expressed by a simultaneous conversion matrix indicating the position and posture of the robot hand 19.

The controller communication unit 37 is given sequentially each movement position obtained by the second CPU 39 and gives the information indicating the movement positions to the servo communication unit 41 which will be described later. Further, the controller communication unit 37, when a setting position output signal is given from the second CPU 39, outputs the output signal toward another controller. The second memory 40 stores the operation program of the second CPU 39 and stores the calculation results given from the second CPU 39.

The control unit 36 is structured so as to include the servo communication unit 41, a third CPU 42, a third memory 43, and amplifiers 44. The servo communication unit 41 is installed so as to communicate information with the controller communication unit 37. Further, the third memory 43 stores the operation program of the third CPU 42 and stores the calculation results given from the third CPU 42.

The third CPU 42 is given sequentially the movement position of the robot hand 19 at every control time interval via the controller communication unit 37. The third CPU 42, on the basis of the given movement positions of the robot hand 19, performs reverse conversion calculations. Namely, the third CPU 42 obtains the target displacement position of each of the robot arms for moving to the movement position for the purpose of the robot hand 19. And, the third CPU 42 decides the operation amount instruction value of each of the servo motors 45 for moving the robot arms to the target displacement position. Concretely, the third CPU 42 obtains the detection displacement position of each arm detected from the encoder installed in each of the servo motors 45 and on the basis of the target displacement position and detection displacement position, obtains the operation amount instruction value of each of the servo motors 45 by feedback control.

In this way, the third CPU 42 calculates the operation amount instruction value of each of the servo motors 45 at every control time interval and gives individually the operation amount instruction value of each of the servo motors to each of the corresponding amplifiers 44. Each of the amplifiers 44, on the basis of the operation amount instruction values given from the third CPU 42, gives a current in accordance with the operation amount instruction value of each of the servo motors 45 to the corresponding servo motors 45. By doing this, each of the servo motors 45 moves each of the robot arms to the target displacement position calculated by the third CPU 42 and can move the robot hand 19 to the movement position. The movement position of the robot hand 19 is sequentially changed at every control time interval in this way, thus the robot hand 19 can be moved along the movement route.

In this embodiment, the controller 24, when judging that the movement position, where the robot hand 19 exists, passes through the setting position during movement of the robot hand 19 along the movement route from the movement start position to the movement end position, executes the operation contents in accordance with the setting position. Concretely, when the robot hand 19 passes through the distal setting position C2 which is a setting position, the controller 24 outputs the entrance prohibition signal which is a setting position passing signal. Therefore, the first memory 33 becomes an information storage unit for storing the setting position relating information and operation content information. Here, the setting position relating information is information which is set together with the movement route, thereby can decide a setting position to be set on the movement route. Further, the operation content information is information indicating the operation contents to be performed when the robot hand 19 passes through the setting position. A part or all of such setting position relating information and operation content information are input beforehand from an external device or an operator via the input-output unit 34.

The first CPU 32 obtains the setting position relating information stored in the first memory 33 and on the basis of the obtained setting position relating information, calculates the setting position. Namely, the first CPU 32 serves as a setting position calculation unit for calculating the setting position. And, the first CPU 32 gives information relating to the setting position to the second CPU 39 together with the operation plan of the robot 21. The second CPU 39, when calculating the movement position and judging that the calculated movement position passes through the setting position, on the basis of the operation content information stored in the first memory 33, executes the operation contents corresponding to the setting position. In this embodiment, the second CPU 39, when judging that the calculated movement position passes through the setting position, outputs a setting position passing signal by the controller communication unit 37. Namely, the second CPU 39 becomes an operation content execution unit for executing the operation contents corresponding to the setting position.

Such an electric constitution of the controller 24 is an example and can be formed as another configuration. For example, the calculation operations of the first to third CPUs may be performed by one CPU. Further, the third CPU 42 may perform the reverse conversion calculation and the amplifiers 44 may perform the feedback control for the servo motors. Further, among the controller 24, the control unit 36 may be separated from the remaining part. Further, the controller 24 is installed for each robot in the embodiment, though one robot control may supervise and control each robot.

FIG. 3 is a drawing for explaining the setting position relating information. In this embodiment, when moving the robot hand 19 from the movement start position A to the movement end position B, the movement route 10 is set so as to move the robot hand 19 along the straight line connecting the movement start position A and movement end position B. Further, the setting position C is arranged between the movement start position A and the movement end position B on the movement route 10.

Further, the setting position relating information is necessary to decide the setting position C and includes a relating position E having a predetermined relevance to the movement route 10 and setting position C and information indicating the relevance. In this embodiment, the position closest to the relating position E on the movement route 10 is decided as the setting position C. Concretely, the position where the plane perpendicular to the movement route 10 passing through the relating position E intersects the movement route 10 is decided as the setting position C. In this case, straight lines F1 to F5 extending from the relating position E to movement positions $x_1$ to $x_5$, as the movement position $x_i$ approaches the movement end position B, gradually become shorter and then gradually become longer. And, the movement position $x_5$ where the length becomes shortest and then starts to become longer is the movement position $x_5$ passing through the setting position C.

In this embodiment, as movement route decision information for deciding the movement route 10, it is predetermined that the straight line connecting the movement start position A and movement end position B becomes the movement route 10. Further, the movement start position A and movement end position B are taught from an operator. In this case, the first CPU 32 can calculate the movement route 10 on the basis of the movement route decision information, movement start position A, and movement end position B.

Further, when the position relating information indicating the positional relationship between the setting position C and the relating position E is predetermined, the relating position E is taught by the operator, thus the first CPU 32 can calculate the setting position C on the basis of the pre-calculated movement route 10 and relating position E. Namely, when the movement route decision information and the position relating information are preset, the first CPU 32 can calculate the setting position C set on the movement route since the movement start position A, the movement end position B, and the relating position E are taught.

To calculate the setting position C by the controller 24, the operator selects the movement route decision information and the positional relationship information and then may just decide the movement start position A, the movement end position B, and the relating position E. By doing this, the setting position C can be set indirectly on the movement route and compared with a case of direct teaching of the setting position C, the teaching operation can be performed easily.

Figure 4:
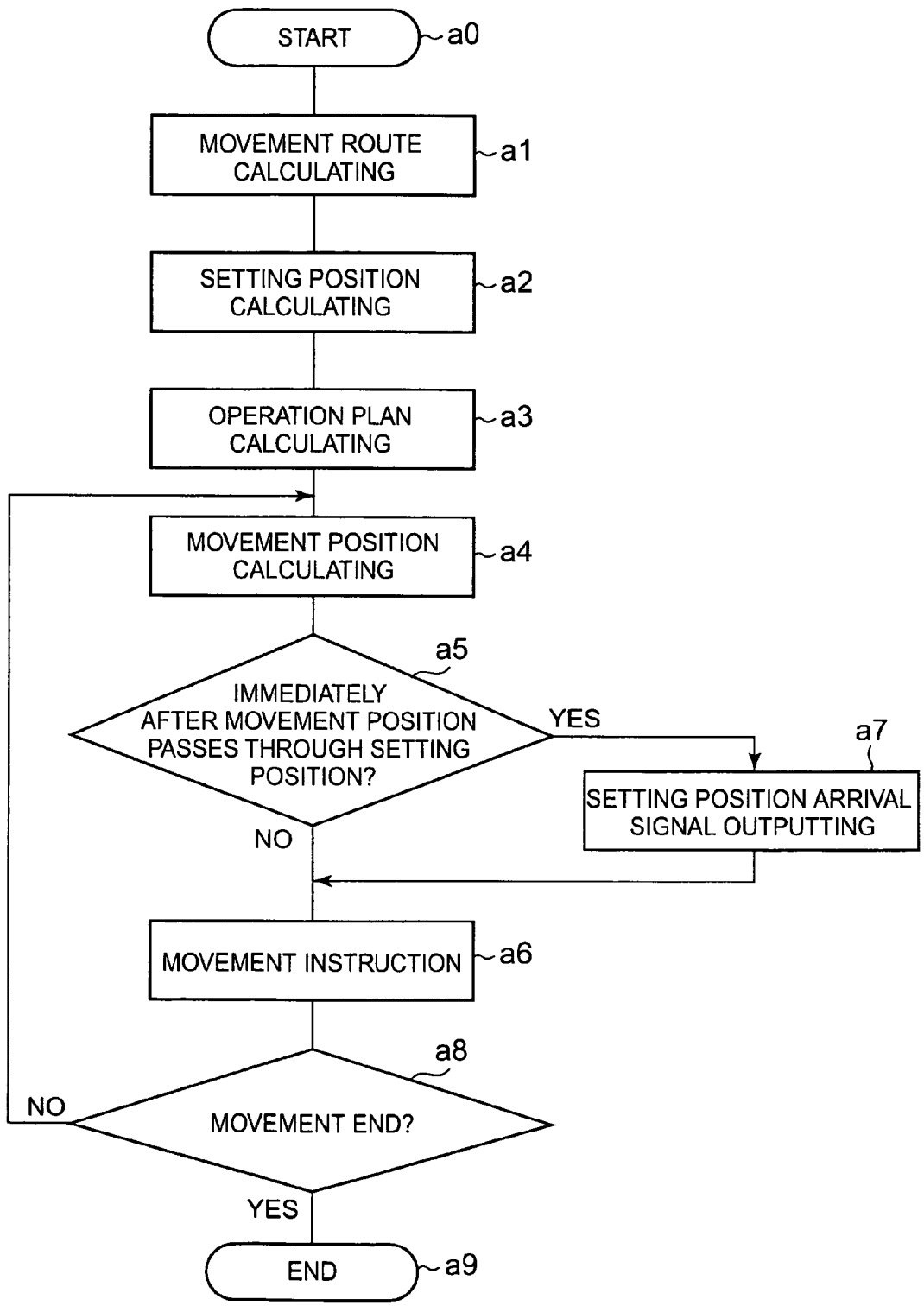
FIG. 4 is a flow chart showing a robot control procedure by the controller 24.

FIG. 4 is a flow chart showing the robot control procedure by the controller 24. If an operation start instruction of the robot hand 19 is given from an operator or an external device when a robot operation program indicating information such as the movement start position A, the movement end position B, the relating position E, the movement route decision information, the positional relationship information, the speed setting and acceleration setting of the robot hand 19, and the opening and closing position of the robot hand 19 is stored in the first memory 33, the process goes to Step a1 and the controller 24 starts the robot control operation.

At Step a1, the first CPU 32 calculates the movement route 10 on the basis of the movement start position A, the movement end position B, and the movement route decision information which are stored in the first memory 33. In this embodiment, as described above, the fist CPU 32 calculates the movement route 10 which is linearly connected between the movement start position A and the movement end position B. When the first CPU 32 calculates the movement route 10, the process goes to Step a2.

At Step a2, the first CPU 32 calculates the setting position C on the movement route 10 on the basis of the movement route 10 calculated at Step a1, the position relating information stored in the first memory 33, and the relating position E. When the first CPU 32 calculates the setting position C, the process goes to Step a3.

At Step a3, the first CPU 32 decodes the robot operation program stored in the first memory 33. The first CPU 32 generates a robot operation plan on the basis of the decoded information. And, the first CPU 32 gives the generated robot operation plan to the second-CPU 39 and goes to Step a4.

At Step a4, the second CPU 39 calculates the movement positions $x_1$ to $x_5$ at every control time interval when moving the robot hand 19 along the movement route 10. Concretely, the second CPU 39, for the movement position $x_{i-1}$ calculated last, calculates the next movement position $x_i$ when a predetermine control time interval elapses. If the movement position calculated last does not exist, the second CPU 39, for the movement start position A, calculates the movement position $x_1$ to which the robot hand moves after a lapse of the predetermined control time interval. When one movement position $x_i$ is calculated in this way, the CPU 39 goes to Step a5.

At Step a5, the second CPU 39 judges whether the movement position $x_i$ calculated at Step a4 is the position immediately after passing through the setting position C calculated at Step a2 or not, and when judging that it is not the position immediately after passing through, the second CPU 39 goes to Step a6. Further, when judging that it is immediately after passing through, the second CPU 39 goes to Step a7. At Step a7, the second CPU 39 outputs a setting position passing signal toward the other robot controller via the controller communication unit 37 and goes to Step a6.

At Step a6, the second CPU 39 gives the movement position $x_i$ calculated at Step a4 to the third CPU 42 via the communication units 37 and 41. The third CPU 42 performs the reverse conversion process and servo process for the movement position $x_i$ given from the second CPU 39 and decides the operation amount instruction values given to the amplifiers 44. The amplifiers 44 send the currents in accordance with the operation amount instruction values given from the third CPU 42 to the corresponding servo motors 45, thus the robot hand 19 moves to the movement position $x_i$. When the second CPU 39 gives the movement position $x_i$ to the third CPU 40, it goes to Step a8.

At Step a8, the second CPU 39 judges whether the movement position $x_i$ calculated at Step a4 reaches the movement end position B of the robot hand 19 or not. When it does not reach the movement end position B, the second CPU 39 returns to Step a4 and repeats Steps a4 to a8. Further, at Step a8, when the second CPU 39 judges that the movement position $x_i$ calculated at Step a4 reaches the movement end position B of the robot hand 19, it goes to Step a9 and finishes the control operation corresponding to one robot operation plan.

If a plurality of robot operation plans are included in one operation program, when one operation plan is finished, the second CPU 39 repeats Steps a1 to a8. And when judging that all the operation plans are completed, the second CPU 39 finishes the robot control operation.

As mentioned above, in this embodiment, the robot movement arithmetic unit 31 calculates a plurality of movement positions $x_i$ at every control time interval when moving the robot hand 19 from the movement start position A to the movement end position B. And, the control unit 36 decides each axial movement amount of the robot 21 on the basis of each movement position $x_i$ calculated by the robot movement arithmetic unit 31. And, each of the amplifiers 44 gives a current in accordance with each axial movement amount to each of the servo motors 45.

Further, the first CPU 32 of the interface unit 30 obtains the setting position relating information for calculation of the setting position C and calculates the setting position C on the basis of the setting position relating information. And, during movement of the robot hand 19 from the movement start position A to the movement end position B by the control unit 36, the robot movement arithmetic unit 31 judges whether the next movement position $x_i$ of the robot hand 19 passes through the setting position C or not. The robot movement arithmetic unit 31 outputs the setting position passing signal when judging that the robot hand 19 passes through the setting position C.

In this embodiment, as a setting position, as shown in FIG. 2, the proximal setting position C1 existing in the neighboring space of the press 1 and the distal setting position C2 existing outside the neighboring space of the press 1 are set respectively. The controller 24 of the robot 21 on one side, upon receipt of an entrance prohibition signal outputted from the robot controller 24 of the robot 21 on the other side, waits for movement of the robot hand 19 of the robot 21 controlled by itself into the neighboring space of the press. And, upon receipt of a distal signal, the robot controller 24 restarts movement of the robot hand 19 into the neighboring space of the press 1. Therefore, the robots can be prevented from mutual interference and the inter-press transfer of the workpiece 2 can be performed smoothly.

Further, in this embodiment, under control, the movement route and setting position C are calculated. However, the first CPU 32 calculates the movement route and the setting position C prior to the robot control and may store the calculation results in the first memory 33. By doing this, the load applied on the controller under robot control can be reduced.

Figure 5:
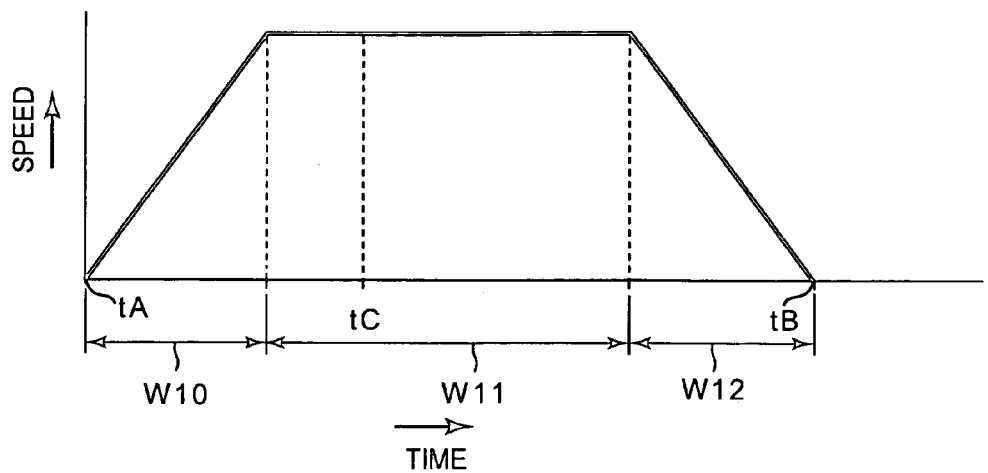
FIG. 5 is a graph showing a change with time of the moving speed of a robot hand 19.

FIG. 5 is a graph showing a change with time of the moving speed of the robot hand 19. For the robot hand 19 of this embodiment, the robot movement arithmetic unit 31 generates a robot operation plan similar to that in a case of direction movement from the movement start position A to the movement end position B, even if one or a plurality of setting positions C are set. Therefore, as shown in FIG. 5, the robot 21 controlled by the controller 24 moves the robot hand 19 by moving speed change in direct movement from the movement start position A to the movement end position B. By doing this, before and after the point of time tC when the robot hand 19 reaches the setting position C, the moving speed of the robot hand 19 will not be lowered. Therefore, the reduction in the moving speed of the robot hand 19 due to existence of the setting position C can be prevented and the movement time of the robot hand 19 can be prevented from undesired prolongation. By doing this, the cycle time can be shortened and the operability by the robot can be improved.

In this embodiment, the robots 21 and 22 move without slowing down before and after the distal setting position C. By doing this, the cycle time of the robots 21 and 22 can be improved. Further, the cycle time of the robot 21 on one side is improved, thus the waiting time of the robot 22 on the other side can be shortened and the cycle time of the robot 22 on the other side can be improved. By doing this, the robots can be prevented from mutual interference and the operability of the robots 21 and 22 can be improved.

Further, according to this embodiment, the interface unit 30 calculates the setting position C from the setting position relating information. Therefore, the operator does not need to directly teach the setting position C. When the operator confirms the relevance between the relating position E and the setting position C, by teaching the relating position E on the basis of the relevance, the controller 24 can calculate the setting position C existing at a position desired by the operator. In this case, only by teaching a rough position of the relating position E relating to the setting position C, the setting position C can be decided accurately on the movement route 10 and the teaching operation of the robot can be performed easily.

Concretely, the relating position E is decided on the plane which extends perpendicularly to the movement route 10 and intersects the setting position C, thus for the relating position E for deciding one setting position C, one of innumerable positions included in the aforementioned plane may be designated and as compared with a case that the coordinates of the setting position C are input and taught, the relating position E can be decided very easily.

Further, the teach pendant is operated by the operator, so that the controller 24 moves the robot hand 19 to the position in accordance with the operation contents of the teach pendant. If the operator confirms the relevance between the relating position E and the setting position C, the operator can judge the setting position C to be set when the robot hand 19 is arranged at the relating position E. Therefore, when the operator confirms where the setting position is arranged, the operator can set the relating position E and compared with a case of direct input of the relating position E, the relating position E can be prevented from a teaching error.

Further, the relevance between the setting position C and the relating position E is stored beforehand in the first memory 33, so that only by teaching the relating position E, the same effect as that when the setting position C is set can be obtained. In this case, the operator does not need to perform a complicated operation such as preparation of a program whenever the operator decides the setting position C, and if even there are a plurality of setting positions C, the operator can perform very easily the teaching operation.

As a comparison example compared with the present embodiment, even if the movement start position A and movement end position B are set, the operator cannot confirm an accurate movement route, so that a test operation of moving the robot from the movement start position A to the movement end position B along the movement route is performed once, and it is necessary to set the setting position C during the test operation.

On the other hand, in this embodiment, teaching of the movement start position A and the movement end position B and teaching of the relating position E can be performed by the teach pendant by one teaching operation and the frequency of execution of the test operation for the robot can be reduced. Therefore, the robot teaching time can be shortened.

Further, in the conventional art, when at least either of the movement start position A and the movement end position B is adjusted finely, the setting position C, which has been already decided, is shifted from the movement route 10 from the movement start position A to the movement end position B. On the other hand, in this embodiment, even if either of the movement start position A and the movement end position B is adjusted finely after decision of the relating position E, the setting position C is re-calculated in accordance with the finely adjusted movement route. Therefore, the trouble of re-setting the setting position C due to fine adjustment of the movement start position A and the movement end position B can be saved.

Further, in this embodiment, the controller 24, when judging that the movement position $x_i$ of the robot hand 19 passes through the setting position C, outputs a setting position passing signal. Therefore, even if the moving speed and acceleration of the robot hand 19 are changed, the controller 24 can output the setting position passing signal at the position not changed from the one before changing. Therefore, even if the moving speed of the robot hand 19 is varied, the position for outputting the signal is not changed and the robots can be prevented from interference.

Figure 6:
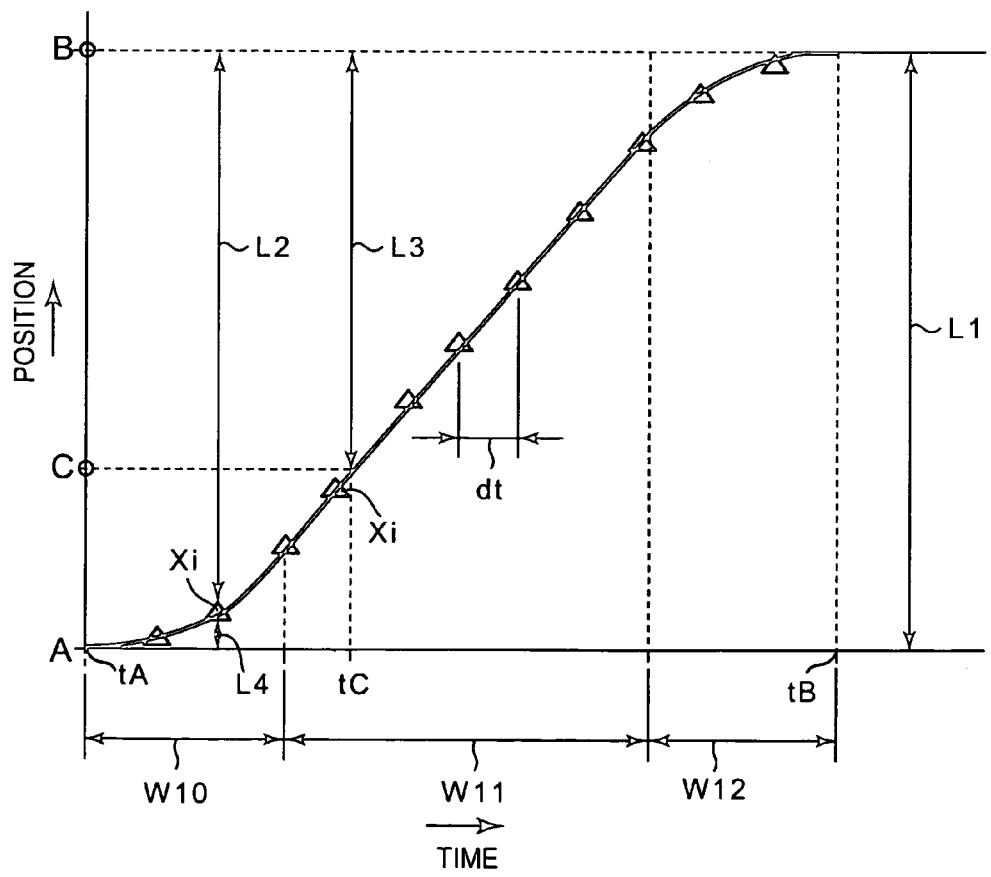
FIG. 6 is a drawing showing a change with time of the position of the robot hand 19.

FIG. 6 is a drawing showing a change with time of the position of the robot hand 19. As shown in FIG. 6, the robot hand 19 of this embodiment, during an acceleration period W10 until arrival at a predetermined point of time of fixed speed after movement start from the movement start position A, is accelerated at a predetermined acceleration. And, during a fixed speed period W11 until arrival at a predetermined point of time of deceleration after the point of time of fixed speed, the robot hand 19 moves at the fixed speed. And, during a deceleration period W12 until movement from the point of time of deceleration to the movement end position B, the robot hand 19 slows down at a negative acceleration.

The second CPU 39 judges at what period of time the movement position $x_i$ changing at every control time interval dt passes the setting position C using a first distance L1, a second distance L2, and a third distance L3. Here, the first distance L1 indicates a distance along the movement route 10 from the movement start position A to the movement end position B. Further, the second distance L2 indicates a distance along the movement route 10 from the movement end position B to the movement position $x_i$. Further, the third distance L3 indicates a distance along the movement route 10 from the movement end position B to the setting position C.

A parameter value S which is a value obtained by dividing the second distance L2 by the first distance L1, i.e., (L2/L1) is "1" when the robot hand 19 is located at the movement start position A. And, it decreases in correspondence with a lapse of time and when the robot hand 19 is located at the movement end position B, the parameter value S is "0". Therefore, assuming the movement end position as B, the movement start position as A, and the parameter value as S, a distance L4 from the movement start position A to the movement position $x_i$ is expressed as B−(B−A)•S.

In this embodiment, the second CPU 39 judges that the movement position $x_i$ passes through the setting position E when the rate of the second distance L2 to the first distance L1 (L2/L1) becomes lower than the rate of the third distance L3 to the first distance L1 (L3/L1). As mentioned above, on the basis of the movement amount L2 from the movement end position B to the movement position $x_i$ and the movement amount L3 from the movement end position B to the setting position C for the movement amount L1 from the movement start position A to the movement end position B, the second CPU 39 decides the timing for outputting the setting position passing signal.

In this case, at Step a2 beforehand, the first CPU 32 calculates the setting position C and also the rate (L3/L1) of the third distance L3 to the first distance L1 and gives the calculation results to the second CPU 39 together with the operation plan. And, at Step a4, the first CPU 32 calculates the movement position of the robot and also the rate (L2/L1) of the second distance L2 to the first distance L1. And, at Step a5, the second CPU 39 judges that the movement position $x_i$ where the robot hand 19 is located passes through the setting position C when judging that the rate (L3/L1) of the third distance L3 to the first distance L1 becomes smaller than the rate (L2/L1) of the second distance L2 to the first distance L1.

As mentioned above, on the basis of the total movement amount from the movement start position A to the movement end position B, the movement amount from the movement position $x_i$ to the movement start position A or the movement end position B, and the movement start from the setting position C to the start position A or the end position B, the second CPU 39 decides the signal output timing, thus as described later in FIG. 9, even if the movement route is corrected, the signal output timing can be prevented from a great variation.

Further, the controller 24 can control the robot in both the ordinary operation mode which is a first operation mode and the test operation mode which is a second operation mode. In the ordinary operation mode, the controller 24 controls the robot so as to sequentially move the robot hand 19 to each movement position $x_i$ at every control time interval dt. Further, in the test operation mode, the controller 24 controls the robot so as to stop temporarily the robot hand 19 at the setting position C, during movement of the robot hand 19 from the movement start position A to the movement end position B along the movement route.

Figure 7:
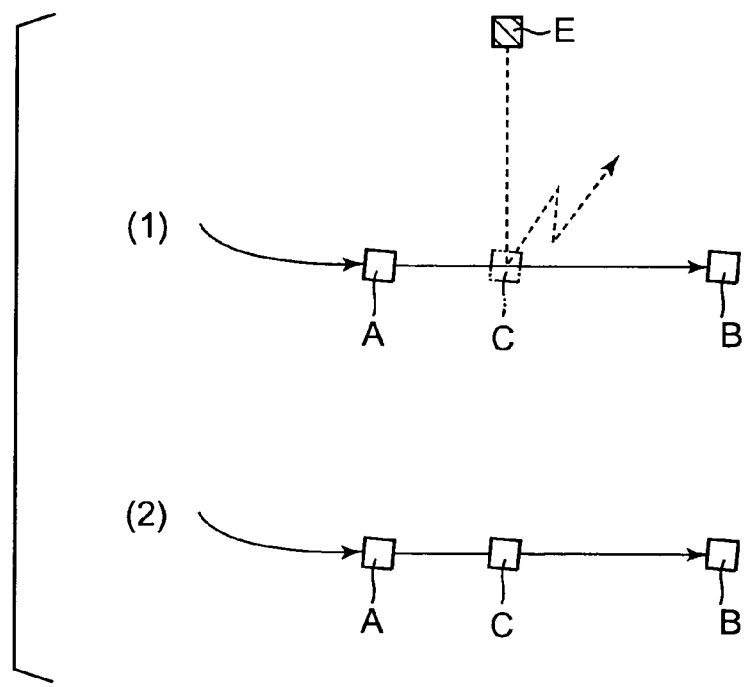
FIG. 7 includes drawings for explaining an ordinary operation mode and a test operation mode.
Figure 8:
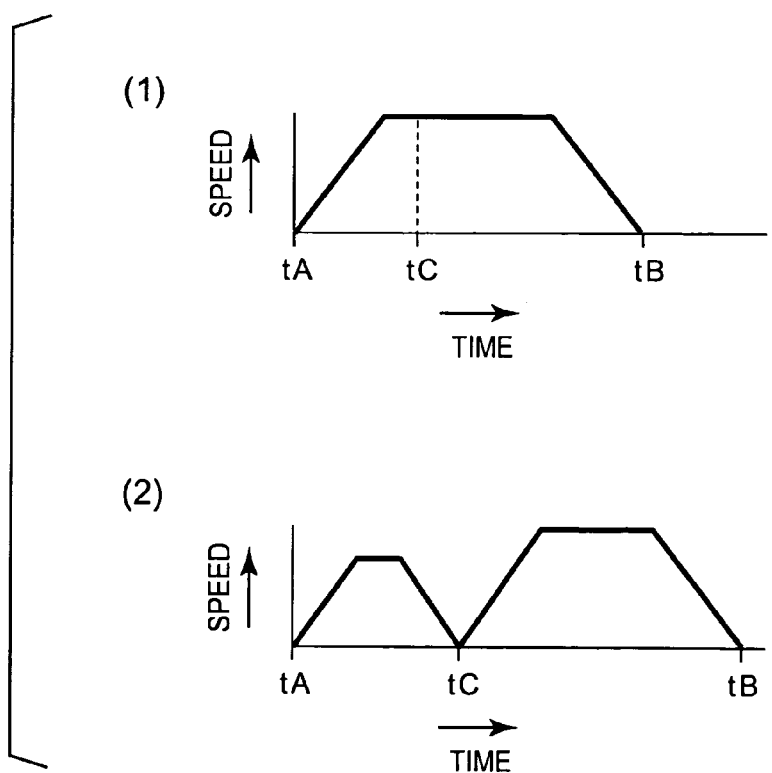
FIG. 8 includes drawings for explaining the ordinary operation mode and the test operation mode.

FIGS. 7 and 8 are drawings for explaining the ordinary operation mode and the test operation mode. FIG. 7(1) shows the movement condition of the robot hand 19 in the ordinary operation mode and FIG. 7(2) shows the movement condition of the robot hand 19 in the test operation mode. Further, FIG. 8(1) shows a change with time of the moving speed in the ordinary operation mode and FIG. 8(2) shows a change with time of the moving speed in the test operation mode.

As shown in FIGS. 7(1) and 8(1), in the ordinary operation mode, the controller 24 moves the robot hand 19 without stopping it at the setting position C. On the other hand, as shown in FIGS. 7(2) and 8(2), in the test operation mode, the controller 24 stops once the robot hand 19 at the setting position C and when a restart operation instruction is given from the operator, restarts the movement of the robot hand 19. In the test operation mode, the second CPU 39 outputs an output signal at Step a7, gives an instruction indicating a standby at the place to the third CPU 42, and when the restart instruction is given from the operator, goes to Step a8.

The operator, by execution of the test operation mode, can confirm outputting of the setting position passing signal when the robot hand 19 is actually located at what position, prevent a teaching error, and improve the convenience. Further, for example, when finely adjusting the setting position C, it is possible to move the robot hand 19 by the teach pendant from the condition that the robot hand 19 is stopped in the test operation mode and re-teach the relating position E. Further, it is possible to input the movement amount between the desired setting position and the present setting position. By doing this, the setting position passing signal can be outputted more surely at the desired position of the operator. Further, when a plurality of setting positions are calculated from one setting position relating information, the setting position desired by the operator may be selected.

Further, when the confirmation of the setting position by the operator in the test operation mode is completed, the operator selects the ordinary operation mode, thus in the actual movement operation of the robot hand 19, the reduction in the moving speed of the robot hand 19 due to existence of the setting position C can be prevented.

Figure 9:
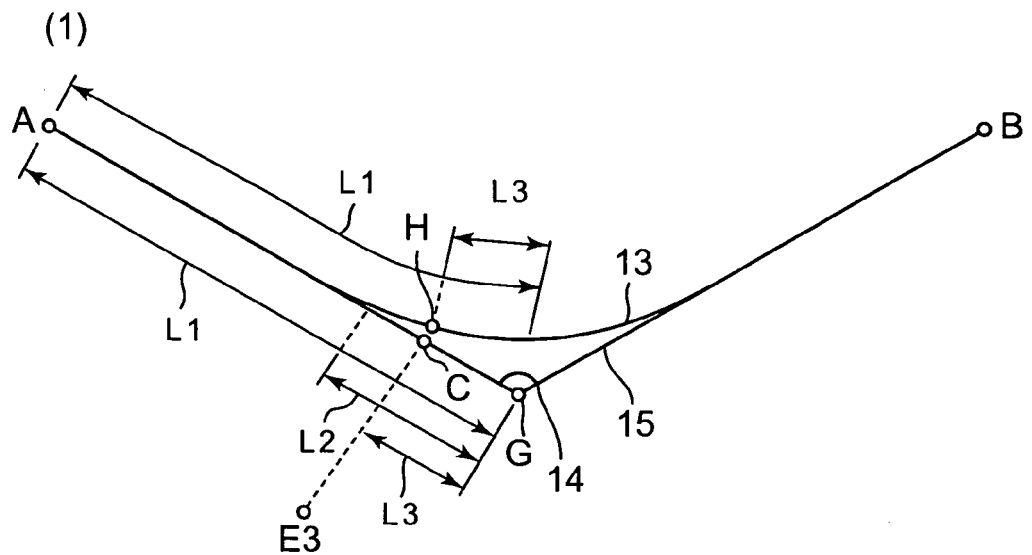
FIG. 9 is includes drawings showing movement route 13 in a modification of the first embodiment.
Figure 9:
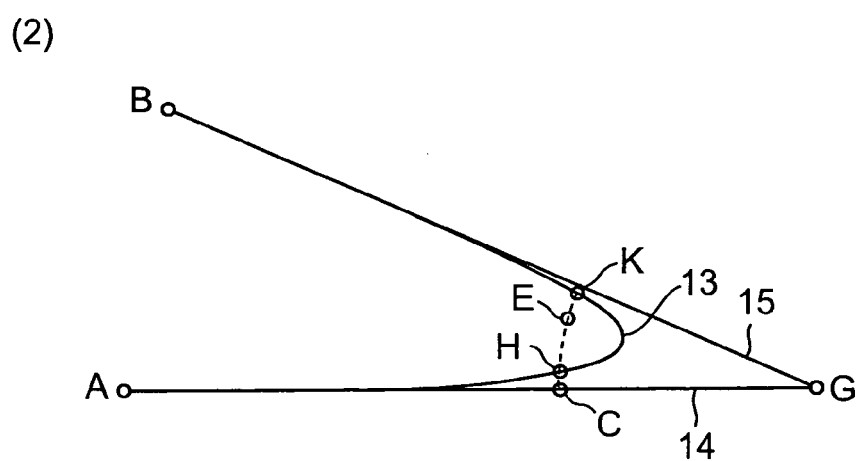

FIG. 9 is a drawing showing a movement route 13 in a modification of the first embodiment. There is a case available that the movement start position A, the movement end position B, and a halfway position G are taught and a movement route 14 from the movement start position A to the halfway position G and a movement route 15 from the halfway position G to the movement end position B are set.

In the first embodiment aforementioned, the robot hand 19 moves from the movement start position A to the halfway position G and then moves from the halfway position G to the movement end position B. Further, when the setting position C is set between the movement start position A and the halfway position G, the controller 24 outputs the output signal when the movement position $x_i$ passes through the setting position C during movement from the movement start position A to the halfway position G.

On the other hand, as a modification of the first embodiment, before completion of the first operation of movement from the movement start position A to the halfway position G, the second operation of movement from the halfway position G to the movement end position B is started. By doing this, as shown in FIG. 9, the robot hand 19 moves along a smooth track in the neighborhood of the halfway position G without passing through the halfway position G and moves from the movement start position A to the movement end position B. Therefore, the robot hand 19 moves on the correction movement route 13 which is corrected for the standard movement route 14 which is a standard.

In the modification, on the basis of the rates of the second distance L2 along the standard movement route 14 from each movement position $x_i$ to the halfway position G to the first distance L1 along the standard movement route 14 from the movement start position A to the halfway position G and of the third distance L3 along the standard movement route 14 from the setting position C to the halfway position G to the first distance L1, the controller 24 decides the timing for outputting the setting position passing signal. Namely, when moving the robot hand 19 along the correction movement route 13, if the value (L2/L1) obtained by dividing the second distance L2 by the first distance L1 becomes smaller than the value (L3/L1) obtained by dividing the third distance L3 by the first distance L1, the controller 24 outputs the output signal.

As shown in FIG. 9(2), depending on the positional relationship of the movement start position A, the movement end position B, and the halfway position G, when deciding the position closest to the relating position E of the movement route as a setting position, the setting position C set by the standard movement route 14 and a setting position K set by the correction movement route 13 may be shifted greatly from each other. In this embodiment, the setting position is decided on the basis of the rates aforementioned, so that the setting position C when the standard movement route 14 is moved and a setting position H when the correction movement route 13 is moved can be prevented from a great shift.

Figure 10:
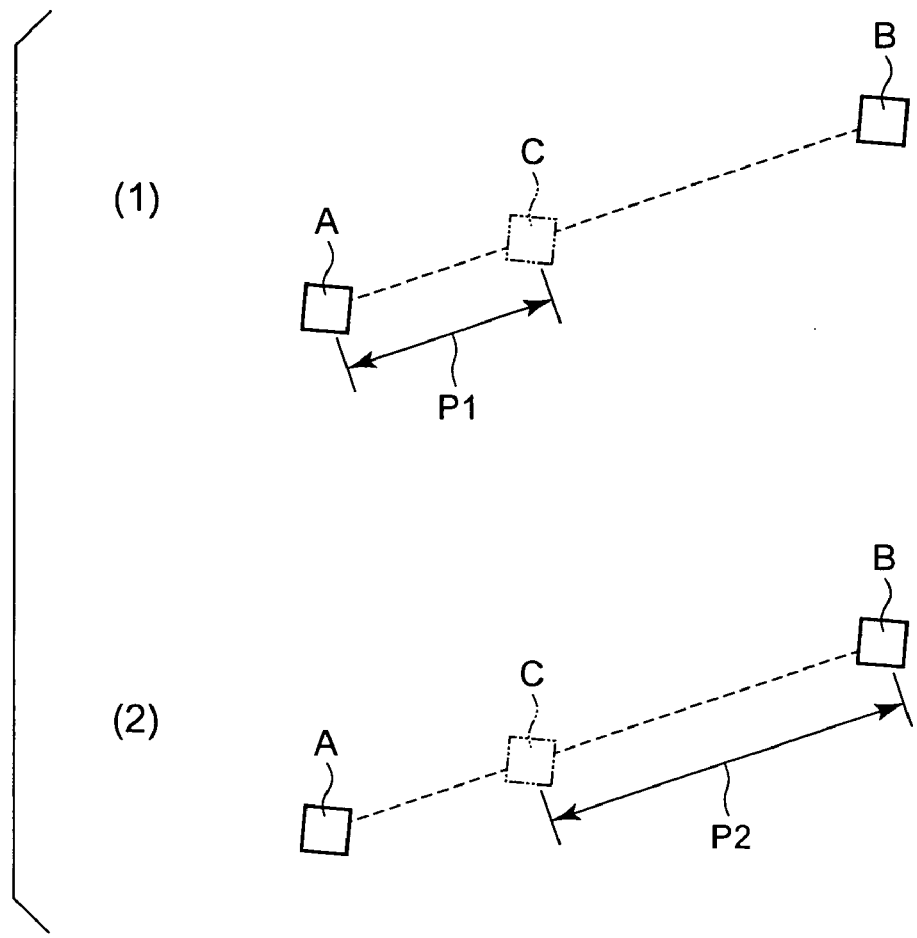
FIG. 10 includes drawings for explaining another setting position relating information.

FIG. 10 is a drawing for explaining another setting position relating information. Although in the setting position relating information aforementioned, as shown in FIG. 3, the position closest to the relating position E on the movement route is set as the setting position C, any position other than it is acceptable. As another setting position relating information, information of section distances P1 and P2 along the movement route 10 from either of the movement start position A and the movement end position B to the setting position C is set. In this case, the setting position relating information includes the section distances P1 and P2 and distance relating information indicating which one is used as a standard, the movement start position A or the movement end position B, to set the section distances P1 and P2.

For example, when it is decided as distance relating information to use the movement start position A as a standard, by teaching the section distance P1 by the operator, the first CPU 32, on the basis of the movement route 10 calculated beforehand and the section distance P1 taught, as shown in FIG. 10(1), the position moved by the section distance P1 from the movement start position A toward the movement end position B along the movement route 10 can be calculated as a setting position C.

Further, for example, when it is decided as distance relating information to use the movement end position B as a standard, by teaching the section distance P1 by the operator, the first CPU 32, on the basis of the movement route 10 calculated beforehand and the section distance P2 taught, as shown in FIG. 10(2), the position moved by the section distance P1 from the movement end position B toward the movement start position A along the movement route 10 can be calculated as a setting position C.

In this case, when the operator confirms only the distance P1 or P2 from the movement start position A or the movement end position B to the setting position C, the setting position C can be set at a desired position. By doing this, compared with a case of direct teaching of the setting position C, the teaching operation of the robot 21 can be performed easily.

Furthermore, as another setting position relating information, information on the rate of the setting position movement amount from either of the first position and the second position to the setting position to the total movement amount of the robot hand 19 from the first position to the second position may be set. For example, the parameter S when the robot hand 19 reaches the setting position may be set directly by the operator. Also in this case, if the operator confirms a rough movement route, by inputting the parameter S relating to the setting position, the setting position can be set at a desired position. By doing this, compared with a case of direct teaching of the setting position C, the teaching operation of the robot 21 can be performed easily.

In this embodiment aforementioned, the setting position C is decided on the basis of a predetermined relevance obtained from the rough position or distance taught by the operator. The relevance may be other than the aforementioned relevance. For example, the position where the horizontal plane or vertical plane including the relating position E intersects the movement route may be set as a setting position C. Further, instead of the relating position E, a relating plane may be set. In this case, the position where the relating plane intersects the movement route may be set as a setting position.

Further, in place of the section distances P1 and P2, the rate of the movement amount from the setting position C to the movement start position A or the movement end position B to the distance from the movement start position A to the movement end position B may be taught. Further, in this embodiment, whether the movement position $x_i$ passes through the setting position C or not is judged on the basis of the rate of the movement amount, though it may be judged by another judgement method. Further, the movement route from the movement start position A to the movement end position B may not be linear. Further, the time when the robot hand 19 reaches the setting position may be given as setting position relating information.

Further, in this embodiment, the second CPU 39 judges that the robot hand 19 passes the setting position C when the movement position passes through the setting position C. However, in addition to it, when the movement position enters the setting position area C set in the neighborhood of the setting position C, the second CPU 39 may judge that the robot hand 10 passes through the setting position C or when the movement position coincides with the setting position, the second CPU 39 may judge that the robot hand 10 passes through the setting position C.

Figure 11:
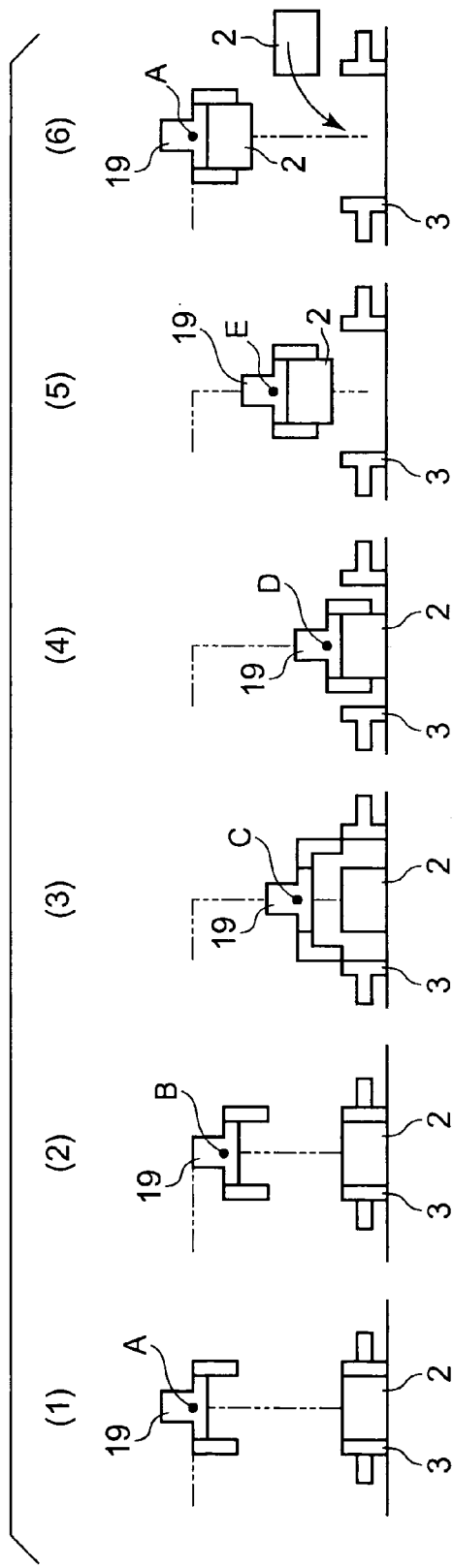
FIG. 11 includes drawings showing a robot operation for explaining another embodiment of the present invention.
Figure 12:
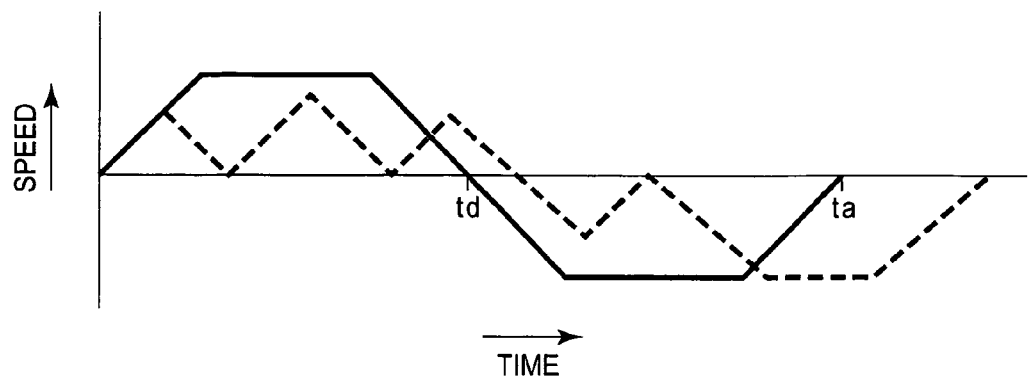
FIG. 12 is a graph showing a change with time of the speed of the robot hand when the operation of the program shown in Table 2 is performed.

FIG. 11 is a drawing showing the robot operation for explaining another embodiment of the present invention. The robot operates in the order of (1) to (6) of FIG. 11, holds a workpiece held by the chuck of the robot hand 19, and transfers the workpiece to a predetermined place. A part of a program example in this case is shown in Table 2 indicated below. Further, FIG. 12 is a graph showing a change with time of the speed of the robot hand when the operation of the program shown in Table 2 is performed.

Although as an operation content to be performed when the robot hand 19 passes through the setting position C, outputting of the setting position passing signal for interference prevention is described above, the operation content is not limited to it. For example, hand opening and closing instructions, chuck opening and closing instructions, or an operation instruction to another device may be given.

TABLE 2

| : | : |
|---|---|
| LMOVE | #A |
| SIGPOINT | #B, 1, 2 (Hand opening instruction, chuck opening instruction) |
| SIGPOINT | #C, −1 (Hand closing instruction) |
| LMOVE | #D |
| SIGPOINT | #E, 3 (Workpiece supply instruction) |
| LMOVE | #A |
| : | |

The controller 24 moves the hand 19 toward the chuck 3 holding the workpiece 2 and stops it at the first position A on the workpiece 2 (LMOVE #A). Next, the controller 24, during movement from the first position A to the second position D (LMOVE #D), gives an instruction of opening the hand 19 and an instruction of opening the chuck 3 (SIGPOINT #B, 1, 2) when judging that the hand 19 passes through the first setting position B close to the chuck 3 from the first position A, and gives an instruction of closing the hand 19 (SIGPOINT #C, −1) when judging that the hand 19 passes through the second setting position C close to the chuck 3 from the first setting position B, and moves and stops the hand 19 at the second position D (LMOVE #D). When the hand 19 moves to the second position D, it clamps the workpiece 2.

Next, the controller 24 gives an instruction of supplying another workpiece 2 to the chuck 3 (SIGPOINT #E, 3) when judging that the hand 19 passes through the third setting position E farther than the second position D from the chuck 3 during movement from the second position D to the first position A (LMOVE #A), and moves the hand 19 from the fourth position E to the first position A.

As mentioned above, the controller for the robot hand judges that the hand 19 passes through the setting positions B, C, and E preset on the movement route and executes the operation contents. Further, the controller moves the hand 19 without stopping at the setting positions. The hand stops at the point of time ta when it reaches the first position A and the point of time td when it reaches the second position D. FIG. 12 shows a change with time of the speed of the robot hand 19 of the present embodiment by a solid line and shows a change with time of the related art by a dashed line. As shown in FIG. 12, in this embodiment, the hand 19 moves without stopping at the setting positions B, C, and E, so that the movement operation of the hand 19 is prevented from being discontinued. Therefore, the operation time of the robot can be shortened and the operation efficiency can be improved. For the robot used for other than press transfer like this, the same effect can be obtained.

Figure 13:
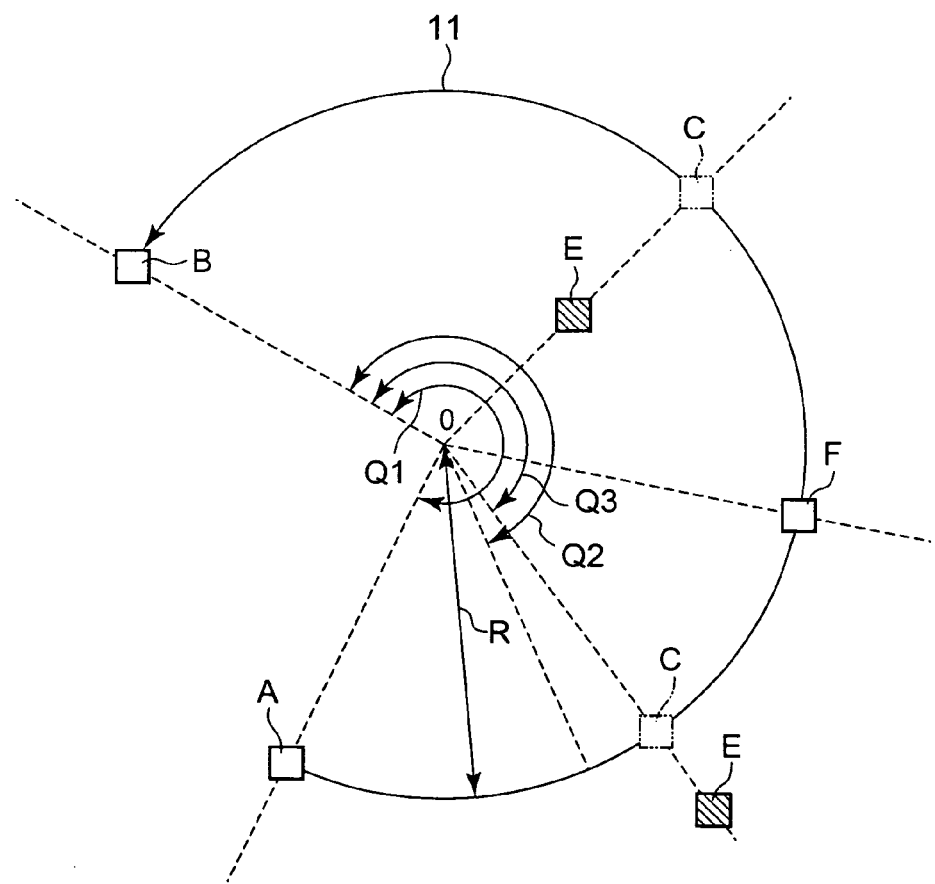
FIG. 13 is a drawing showing the movement route 11 in an arc shape.

FIG. 13 is a drawing showing a movement route 11 in an arc shape. In the embodiment aforementioned, the robot hand 19 moves along the straight line connecting the movement start position A and the movement end position B. However, when moving the robot hand 19 from the movement start position A to the movement end position B, it may move so as to draw an arc track passing through a passing position F. In this case, the movement route 11 passes through the movement start position A, the movement end position B, and the passing position F and forms an arc track having a predetermined radius R around a predetermined center position.

For example, as setting position relating information, the position where the plane passing through the relating position E and center position O intersects the movement route 11 is decided as a setting position C. Concretely, an arc angle Q3 making an angular change from the movement end position B around the center position O up to the relating position E is calculated and the position moving by the arc angle Q3 along the movement route 11 from the movement end position B around the center position O is assumed as a setting position C.

Further, as another setting position relating information, the position moving by the section arc angle Q3 along the movement route 11 from either of the movement start position A and the movement end position B around the center position O may be assumed as the setting position C. In this case, the setting position relating information includes the section arc angle Q3 and distance relating information indicating which one is used as a standard, the movement start position A or the movement end position B, to set the section arc angle Q3. When the movement route draws an arc track like this, the setting position relating information as mentioned above is given, thus the setting position C can be calculated.

The second CPU 39, using a first arc angle Q1 around the center position O from the movement start position A to the movement end position B, a second arc angle Q1 around the center position O from the movement end position B to the movement position $x_i$, and a third arc angle Q3 around the center position O from the movement end position B to the movement position C, may judge whether the movement position $x_i$ where the robot hand 19 is located passes through the setting position C or not. In this case, when the rate (Q2/Q1) of the second arc angle Q2 to the first arc angle Q1 becomes smaller than the rate (Q3/Q1) of the third arc angle Q3 to the first arc angle Q1, the second CPU 39 judges that the movement position $x_i$ passes through the setting position C.

Even when the movement track is in an arc shape like this, similarly to the case in a linear shape, the second CPU 39 can judge whether the movement position passes through the setting position C or not. Further, in this embodiment, using the rate of the arc angle, whether the movement position $x_i$ passes through the setting position C or not is judged. However, using the movement distance, whether the movement position $x_i$ passes through the setting position C or not can be judged.

Figure 14:
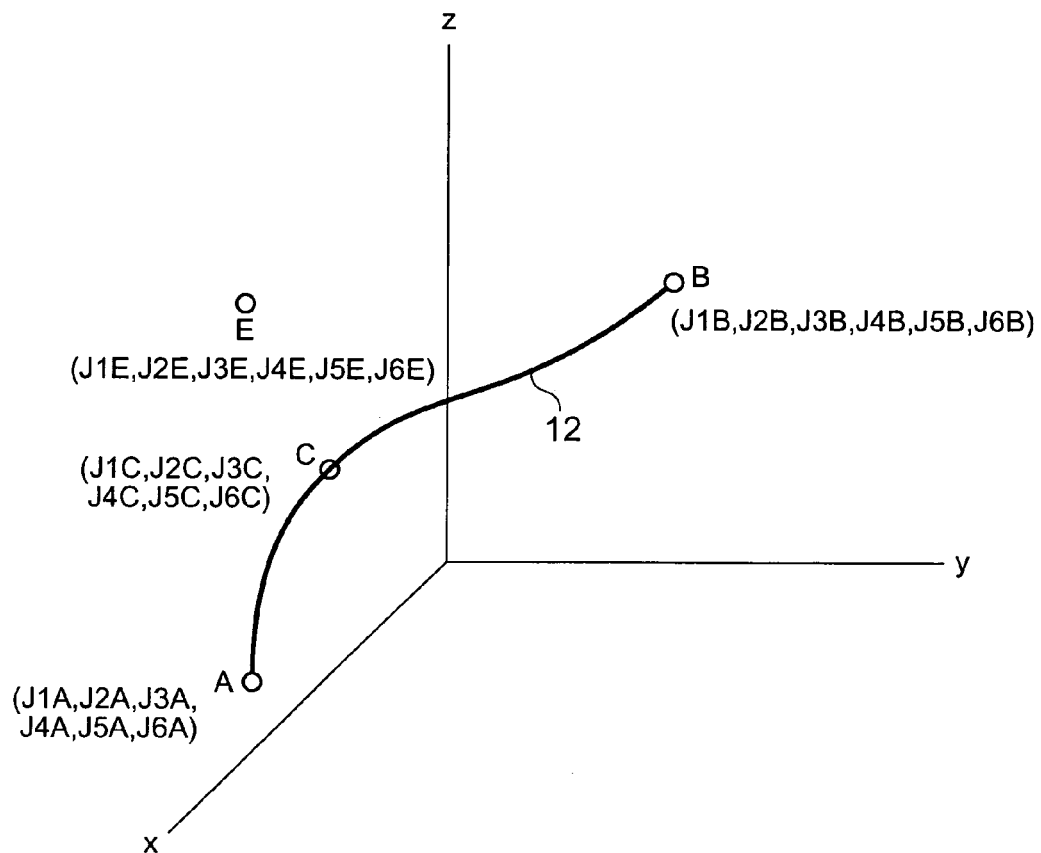
FIG. 14 is a drawing for explaining a case that the movement route 12 is obtained by each axial interpolation.
Figure 15:
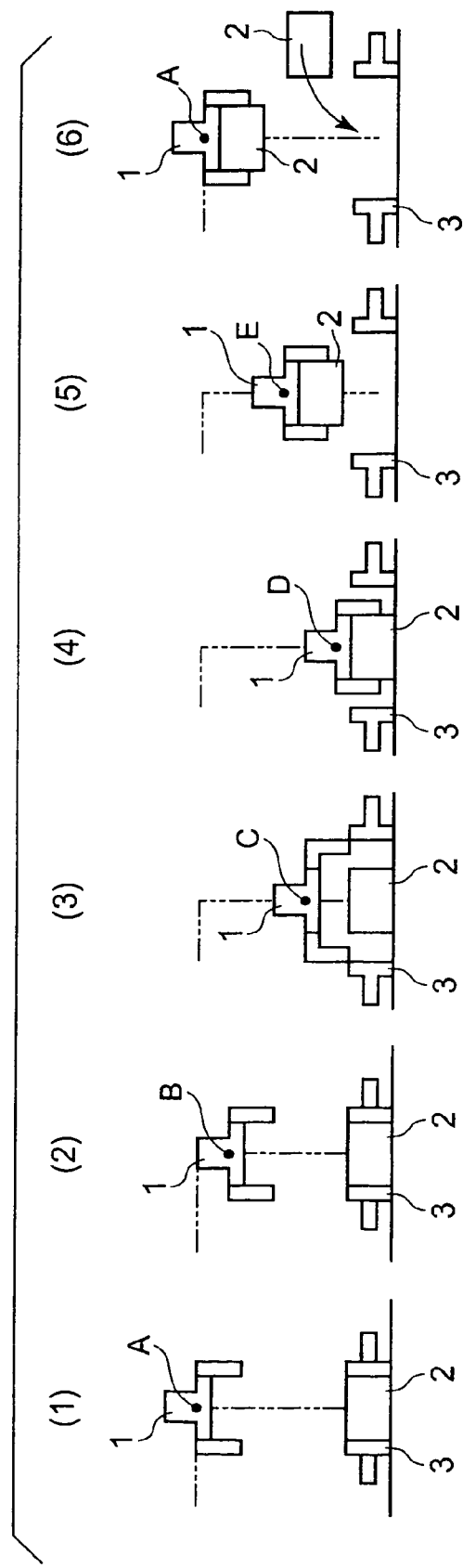
FIG. 15 is a drawing showing the transfer operation of the workpiece 2 by the robot as a related art.
Figure 16:
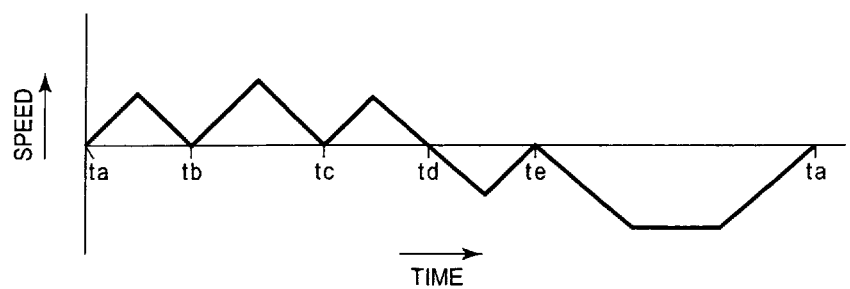
FIG. 16 is a graph showing a change with time of the speed of the robot hand when the operation of the program shown in Table 1 is performed as a related art.
Figure 17:
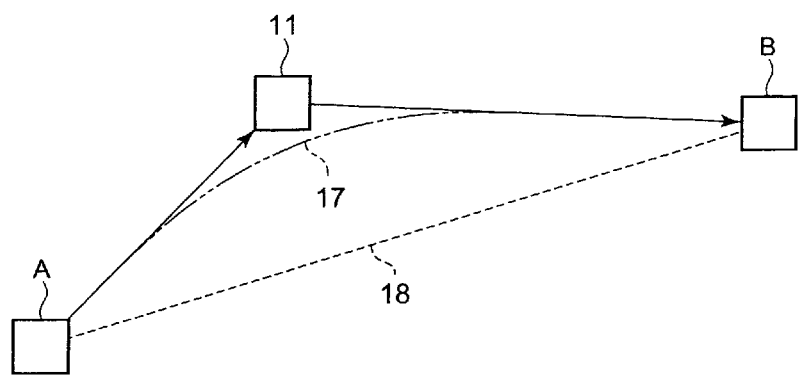
FIG. 17 is a drawing for explaining the movement route of the standard moving part as a related art.
Figure 18:
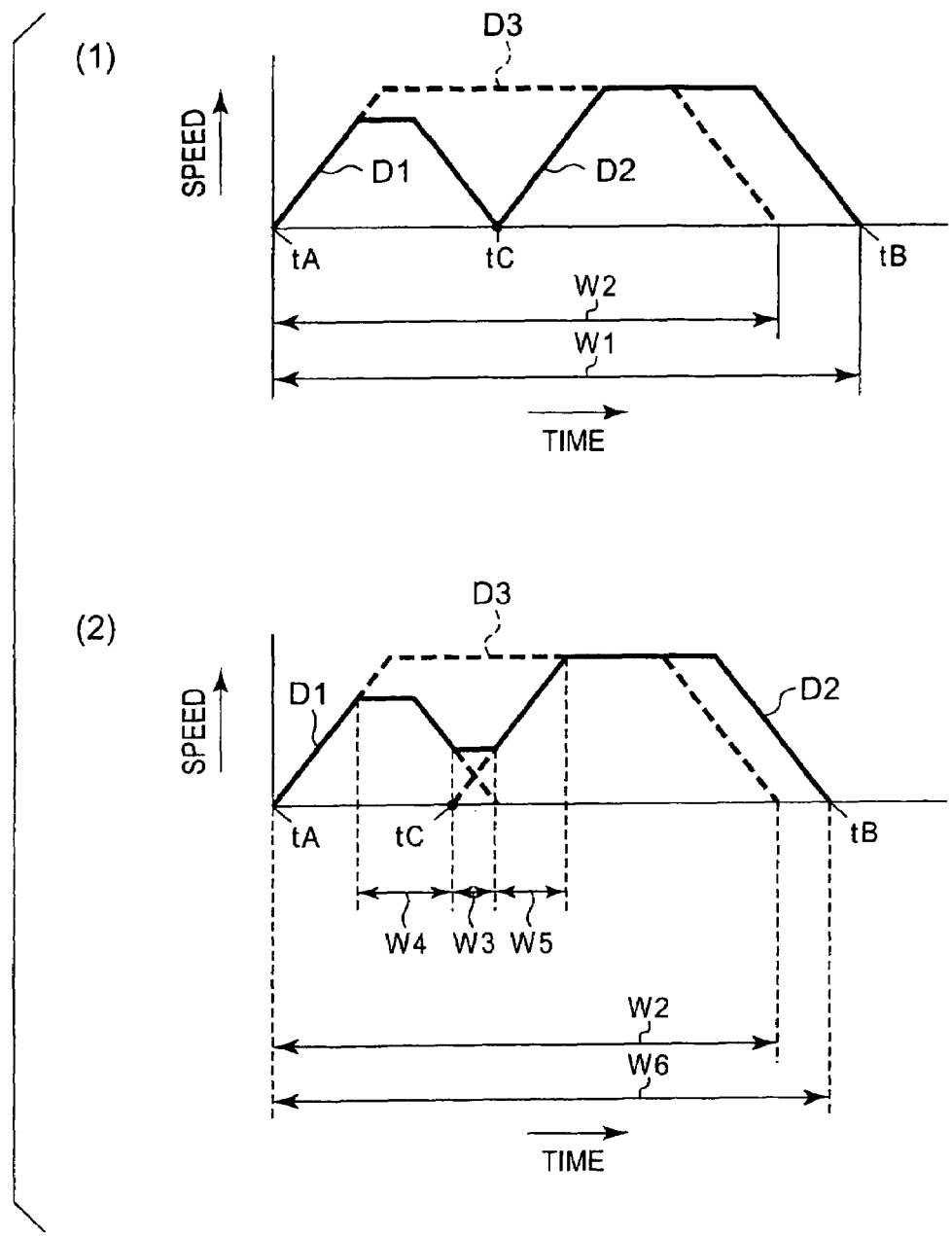
FIG. 18 includes graphs showing a change with time of the moving speed of the standard moving part as a related art.

FIG. 14 is a drawing for explaining a case that a movement route 12 is obtained by each axial interpolation. First position axial change amounts (J1A, J2A, J3A, J4A, J5A, J6A) which are change amounts of the axes of the robot 21 at the movement start position A and second-position axial change amounts (J1B, J2B, J3B, J4B, J5B, J6B) which are change amounts of the axes of the robot at the movement start position B are set for each axis. In this case, the movement route 12 by each axial interpolation is slowly changed from the first position axial change amounts to the second position axial change amounts independently and in parallel for each axis.

In this case, assuming the axis changed at its maximum among axes J1 to J6 during movement from the movement start position A to the movement end position B as a maximum change axis $J_{max}$, as setting position relating information, the movement position $x_i$ of the robot hand 19 when the change amount of the maximum change axis $J_{max}$ during movement from the movement start position A to the movement end position passes through an axial change amount ($J_{max}E$) of the maximum change axis $J_{max}$ at the relating position E is decided as a setting position C.

For example, if the change amount of the first axis is largest when the robot hand 19 moves from the movement start position A to the movement end position $x_i$, when it moves along the movement route 12 from the movement start position A to the movement end position B, the position where a change amount J1 of the first axis coincides with a change amount J1E of the first axis of the relating position E is decided as a setting position C. Therefore, among change amounts (J1C, J2C, J3C, J4C, J5C, J6C) of the axes J1 to J6 at the setting position C, the change amount J1C of the first axis J1 coincides with the change amount J1E of the first axis J1 of the relating position E.

Further, as another setting position relating information, the setting position C may be decided on the basis of the change rate of each axis. In this case, assuming the change amount of the movement start position in the aforementioned maximum change axis $J_{max}$ as $J_{max}A$, the change amount of the movement end position as $J_{max}B$, and the change amount of the relating position E as $J_{max}E$, the position where among the movement positions $x_i$, the maximum change axis $J_{max}$ passes through $(J_{max}E-J_{max}A)/(J_{max}B-J_{max}A)$ may be set as a setting position C. Further, the operator, in place of teaching the relating position E, may input directly $(J_{max}E-J_{max}A)/(J_{max}B-J_{max}A)$.

Even when the movement route 12 by each axial interpolation is set like this, if the setting position relating information as described above is given, the setting position can be calculated. Further, whether the movement position passes through the setting position C or not can be judged.

The embodiment aforementioned is an example of the present invention and within the scope of the present invention, the constitution thereof can be modified. For example, in this embodiment, the robot controller controls the robot performing inter-press transfer, though it can control similarly another robot. For example, the setting position passing signal outputted as an operation content can be used to prevent a spot welding robot from interference.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A robot controller comprising:
    a movement arithmetic unit configured to calculate a plurality of movement positions respectively corresponding to predetermined control time intervals when a standard moving part installed on a multi-axial robot is moved from a first position to a second position along a predetermined movement route;
    a control unit configured to control said robot by deciding each of axial movement amounts of said robot for sequentially moving said standard moving part to each of said movement positions at each of said control time intervals;
    an information storage unit configured to store a setting position relating information for deciding a setting position to be set on said movement route and an operation content information about an operation content to be performed when said standard moving part passes through said setting position;
    a setting position calculation unit configured to calculate said setting position based on said setting position relating information stored in said information storage unit; and
    an operation content execution unit configured to execute said operation content corresponding to said setting position base on said setting position relating information stored in said information storage unit when judging that said movement position, where said standard moving part exists, passes through said setting position during a control of said robot by said control unit based on a calculation result of said movement arithmetic unit.

2. A robot controller according to claim 1, wherein said setting position relating information includes a relating position having a relevance which is predetermined with respect to said movement route and said setting position and a relating information showing said relevance.

3. A robot controller according to claim 2, further comprising an input unit to which a movement instruction of said standard moving part is given,
    wherein said control unit controls said robot so as to move said standard moving part in accordance with said movement instruction which is given from said input unit, and
    wherein said setting position calculation unit uses said movement position of said standard moving part which is moved in accordance with said movement instruction as said relating position to calculate said setting position.

4. A robot controller according to claim 1, wherein said setting position relating information is an information about a movement amount of said standard moving part along said movement route from either of said first position and said second position to said setting position.

5. A robot controller according to claim 1, wherein said setting position relating information is an information about a rate of a setting position movement amount in a movement of said standard moving part from either of said first position and said second position to said setting position to a total movement amount from said first position to said second position.

6. A robot controller according to claim 1, wherein said robot can be controlled in both of a first operation mode for moving said standard moving part sequentially to each of said movement positions at each of said control time intervals and a second operation mode for temporarily stopping said standard moving part at said setting position during a movement of said standard moving part along said movement route from said first position to said second position.

7. A robot control method of moving a standard moving part installed on a multi-axial robot along a predetermined movement route from a first position to a second position, comprising:
    an information storing step of storing said first position, said second position, a setting position relating information for deciding a setting position which is set on said movement route of said standard moving part and an operation content information about an operation content to be performed when said standard moving part passes through said setting position;
    a movement arithmetic step of calculating a plurality of movement positions respectively corresponding to predetermined control time intervals when said standard moving part is moved from said first position to said second position along said predetermined movement route;
    a setting position calculating step of calculating said setting position based on said setting position relating information which is stored by said information storing step,
    a control step of controlling said robot by deciding each of axial movement amounts of said robot for sequentially moving said standard moving part to each of said movement positions at each of said control time intervals; and
    an operation content execution step of executing said operation content corresponding to said setting position based on said setting position relating information stored by said information storing step when judging that said movement position, where said standard moving part exists, passes through said setting position during an execution of said control step.

8. A robot control method according to claim 7, wherein said setting position relating information includes a relating position having a relevance which is predetermined with respect to said movement route and said setting position and a relating information showing said relevance.

9. A robot control method according to claim 8, further comprising a step of inputting a movement instruction of said standard moving part to an input unit,
    wherein said robot is controlled so as to move said standard moving part in accordance with said movement instruction which is given from said input unit, and
    wherein said movement position of said standard moving part which is moved in accordance with said movement instruction is used as said relating position to calculate said setting position in said setting position calculating step.

10. A robot control method according to claim 7, wherein said setting position relating information is an information about a movement amount of said standard moving part along said movement route from either of said first position and said second position to said setting position.

11. A robot control method according to claim 7, wherein said setting position relating information is an information about a rate of a setting position movement amount in a movement of said standard moving part from either of said first position and said second position to said setting position to a total movement amount from said first position to said second position.

12. A robot control method according to claim 7, wherein said robot can be controlled in both of a first operation mode for moving said standard moving part sequentially to each of said movement positions at each of said control time intervals and a second operation mode for temporarily stopping said standard moving part at said setting position during a movement of said standard moving part along said movement route from said first position to said second position.

* * * * *